US010922480B2

(12) United States Patent
Jiang et al.

(10) Patent No.: US 10,922,480 B2
(45) Date of Patent: Feb. 16, 2021

(54) PLACE-BASED INFORMATION PROCESSING METHOD AND APPARATUS

(71) Applicant: Alibaba Group Holding Limited, Grand Cayman (KY)

(72) Inventors: Xueting Jiang, Hangzhou (CN); Yulin Dong, Hangzhou (CN)

(73) Assignee: Alibaba Group Holding Limited

( * ) Notice: Subject to any disclaimer, the term of this patent is extended or adjusted under 35 U.S.C. 154(b) by 88 days.

(21) Appl. No.: 14/733,294

(22) Filed: Jun. 8, 2015

(65) Prior Publication Data

US 2015/0356063 A1  Dec. 10, 2015

(30) Foreign Application Priority Data

Jun. 9, 2014 (CN) .......................... 201410253628.2

(51) Int. Cl.
*G06F 17/00* (2019.01)
*G06F 40/169* (2020.01)
(Continued)

(52) U.S. Cl.
CPC ............ *G06F 40/169* (2020.01); *G06F 16/29* (2019.01); *G06F 16/903* (2019.01);
(Continued)

(58) Field of Classification Search
CPC .. G06F 3/04817; G06F 17/241; G06F 40/169; G06F 16/903
(Continued)

(56) References Cited

U.S. PATENT DOCUMENTS

2002/0075282 A1    6/2002  Vetterli et al.
2002/0143769 A1   10/2002  Tecu et al.
(Continued)

FOREIGN PATENT DOCUMENTS

CN    101918983 A    12/2010
CN    102340594 A     2/2012
(Continued)

OTHER PUBLICATIONS

Extended European Search Report dated Dec. 6, 2017 for European patent application No. 15807102.7, 7 pages.
(Continued)

*Primary Examiner* — Manglesh M Patel
(74) *Attorney, Agent, or Firm* — Lee & Hayes, P.C.

(57) ABSTRACT

Methods and apparatuses for place-based information processing are disclosed. The method includes receiving annotation information inputted by a user; acquiring geographical location information of a mobile terminal device; sending the annotation information and the geographical location information to a server so that the server determines place information of where the user is located according to the geographical location information, establishes and stores a correspondence between the annotation information and the place information to provide the annotation information to a querying user in the place. In the present disclosure, "traces" of the user may be kept in the place and are not subject to an actual condition in the place, which do not need real paper and pen, and do not affect the actual scenery of the place.

20 Claims, 13 Drawing Sheets

(51) Int. Cl.

| | | |
|---|---|---|
| *G06F 16/903* | (2019.01) | |
| *H04W 4/029* | (2018.01) | |
| *H04L 29/08* | (2006.01) | |
| *H04L 29/06* | (2006.01) | |
| *G06F 16/29* | (2019.01) | |
| *G06K 9/00* | (2006.01) | |
| *G06K 9/46* | (2006.01) | |
| *H04L 29/12* | (2006.01) | |
| *H04W 4/02* | (2018.01) | |
| *H04W 64/00* | (2009.01) | |

(52) U.S. Cl.
CPC .......... *G06K 9/00671* (2013.01); *G06K 9/46* (2013.01); *H04L 61/609* (2013.01); *H04L 67/18* (2013.01); *H04L 67/38* (2013.01); *H04L 67/42* (2013.01); *H04W 4/02* (2013.01); *H04W 4/029* (2018.02); *H04W 64/00* (2013.01)

(58) Field of Classification Search
USPC .......................................... 715/231–232, 200
See application file for complete search history.

(56) References Cited

U.S. PATENT DOCUMENTS

| | | |
|---|---|---|
| 2007/0032244 A1 | 2/2007 | Counts et al. |
| 2007/0161382 A1* | 7/2007 | Melinger ................ H04L 67/18 455/456.1 |
| 2009/0081959 A1 | 3/2009 | Gyorfi et al. |
| 2009/0179895 A1 | 7/2009 | Zhu et al. |
| 2010/0081416 A1 | 4/2010 | Cohen |
| 2010/0085383 A1 | 4/2010 | Cohen et al. |
| 2012/0038638 A1 | 2/2012 | Zhu et al. |
| 2012/0218263 A1 | 8/2012 | Meier et al. |
| 2012/0300089 A1 | 11/2012 | Sbaiz et al. |
| 2013/0061148 A1 | 3/2013 | Das et al. |
| 2014/0081904 A1 | 3/2014 | Sitrick et al. |
| 2014/0156787 A1 | 6/2014 | Srivastava |
| 2014/0289605 A1 | 9/2014 | Buelow et al. |
| 2019/0243888 A1 | 8/2019 | Jiang et al. |

FOREIGN PATENT DOCUMENTS

| | | |
|---|---|---|
| CN | 102598064 A | 7/2012 |
| CN | 103765929 A | 4/2014 |
| EP | 2410715 | 1/2012 |
| JP | 2007164534 | 6/2007 |
| JP | 2011520208 A | 7/2011 |

OTHER PUBLICATIONS

PCT Search Report and Written Opinion dated Sep. 15, 2015 for PCT application No. PCT/US15/34670, 9 pages.
Translated Chinese Office Action for Chinese Patent Application No. 201410253628.2, dated Mar. 19, 2018, a counterpart foreign application of U.S. Appl. No. 14/733,294, 14 pages.
Translated Chinese Search Report for Chinese Patent Application No. 201410253628.2, dated Mar. 8, 2018, a counterpart foreign application of U.S. Appl. No. 14/733,294, 1 page.
English-language translation of Second Office Action dated Jan. 4, 2019 by the State Intellectual Property Office of the People's Republic of China in corresponding Application No. 201410253628 (20 pages).
Extended European Search Report dated Feb. 13, 2019 for European Patent Application No. 18211390.2 (9 pages).
The Japanese Office Action dated on Apr. 9, 2019 for Japanese Patent Application No. 2016-571383, a counterpart of U.S. Appl. No. 14/733,294, 16 pages.
Tanaka et al, "Augmented Reaiity Communication System with Smartphones", Correspondences on Human Interface 2010; vol. 12, No. 8, Human Interface Society, Oct. 14, 2010, pp. 115-118.
English translation of the Chinese Office Action dated Jul. 11, 2019, for Chinese Patent Application No. 201410253628.2, a counterpart foreign application of U.S. Appl. No. 14/733,294, 28 pages.
The Chinese Supplemental Search Report dated Nov. 1, 2019 for Chinese Patent Application No. 201410253628.2, 1 page.
The Japanese Office Action dated Nov. 12, 2019 for Japanese Patent Application No. 2016-571383, a counterpart foreign application of the U.S. Appl. No. 14/733,294, 9 pages.
The Japanese Office Action dated Mar. 3, 2020 for Japanese Patent Application No. 2016-571383, a counterpart of U.S. Appl. No. 14/733,294, 6 pages.
The Indian Office Action dated Mar. 19, 2020 for Indian Patent Application No. 201617041171, a counterpart of U.S. Appl. No. 14/733,294, 6 pages.
Non Final Office Action dated Jun. 12, 2020 for U.S. Appl. No. 16/387,260 "Place-Based Information Processing Method and Apparatus" Jiang, 14 pages.
Final Office Action dated Dec. 22, 2020 for U.S. Appl. No. 15/387,260, "Place-Based Information Processing Method and Apparatus", Jiang, 15 pages.

* cited by examiner

PLACE-BASED INFORMATION PROCESSING METHOD AND APPARATUS

CROSS REFERENCE TO RELATED PATENT APPLICATION

This application claims foreign priority to Chinese Patent Application No. 201410253628.2 filed on Jun. 9, 2014, entitled "Place-Based Information Processing Method and Apparatus", which is hereby incorporated by reference in its entirety.

TECHNICAL FIELD

The present disclosure relates to the technical field of applications in mobile terminal devices, and particularly to methods and apparatuses of place-based information processing.

BACKGROUND

In real life, people often have the desire to leave a message at a certain place. For example, when dining in a restaurant, people usually comment on some dishes, express their mood during meals, or record meaningful events of the present day, etc. Therefore, some restaurant owners provide some stickers and pens for customers, so that the customers can write their comments, mood, events or the like on a piece of paper, and put them on the wall of the restaurant. Thereafter, a customer who dines in the restaurant can view messages left by other customers, or the same customer can view messages left previously by himself/herself when eating in the same restaurant. There are many other such places. For example, when visiting a certain tourist attraction, sometimes a tourist may desire to leave a message or leave his/her name to prove that he/she has been there, for example, "someone was here", etc.

However, in a situation where a restaurant owner does not provide any paper and pen or does not allow customers to put thereof on a wall, the customers cannot express messages that they want to write down in the restaurant timely. For a tourist attraction, no tourist will normally carve his/her name, etc., at a scenic spot nowadays for the purpose of scenery protection. This, however, results in a failure of meeting the tourist's desire to make records such as "having been there".

Therefore, when a user needs to leave a message at a certain place, how to help the user so that the user may leave a message at any time and any place without being subject to constraints of the place of writing becomes a technical problem to be solved by one skilled in the art.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

The present disclosure provides a method and an apparatus of place-based information processing, so that "traces" of a user may be kept in a place without being subject to a real condition in the specific place, which does not need real paper and pen and does not affect actual scenery of the place.

The present disclosure provides the following solutions.

A place-based information processing method includes: receiving annotation information inputted by a user; acquiring information of a geographical location where a mobile terminal device is located; and sending the annotation information and the information of the geographical location to a server to enable the server to determine information of a place where the user is located based on the information of the geographical location, establish and store a correspondence relationship between the annotation information and the information of the place for providing the annotation information to a querying user in the place.

A place-based information processing method includes: receiving a request from a querying user to view surrounding annotation information; acquiring geographical location information of the querying user; sending the geographical location information to a server to enable the server to determine a target place where the querying user is located based on the geographical location information, determine and return each piece of annotation information corresponding to the target place based on a pre-stored correspondence relationship between each piece of the annotation information and place information; and providing each piece of the annotation information returned by the server to the querying user.

A place-based information processing method includes: receiving annotation information uploaded by an annotating client and geographical location information of a user mobile terminal device; determining information of a place where the user is located based on the geographical location information; and creating and storing a correspondence relationship between the annotation information and the information of the place to enable determination of a target place where a querying user based on the geographical location information included in a request of querying for annotation information and returning annotation information corresponding to the target place to the querying client in response to receiving the request from the querying client.

A place-based information processing method includes: receiving a request sent by a querying client to query for annotation information, the request including geographical location information of a querying user; determining a target place where the querying user is located according to the geographical location information; and determining annotation information corresponding to the target place based on a pre-created correspondence relationship between the annotation information and place information, and returning thereof to the querying client.

A place-based information processing apparatus includes: an annotation information receiving unit to receive annotation information inputted by a user; a first geographical location information acquisition unit to acquire geographical location information of a mobile terminal device; and a first sending unit to send the annotation information and the geographical location information to a server to enable the server to determine place information where the user is located based on the geographical location information, establish and store a correspondence relationship between the annotation information and the place information for providing the annotation information to a querying user in the place.

A place-based information processing apparatus includes: a view request receiving unit to receive a request sent by a querying user to view surrounding annotation information; a second geographical location information acquisition unit to acquire geographical location information of the querying user; a second sending unit to send the geographical location information to a server to enable the server to determine a target place where the querying user is located according to the geographical location information, to determine and return each piece of the annotation information corresponding to the target place according to a pre-stored correspondence relationship between each piece of the annotation information and information of the place; and an annotation information provision unit, configured to provide each piece of the annotation information returned by the server to the querying user.

A place-based information processing apparatus includes: an information receiving unit to receive annotation information uploaded by an annotating client and geographical location information of a user mobile terminal device; a place information determination unit to determine place information where the user is located according to the geographical location information; and a storage unit to establish and store a correspondence between the annotation information and the place information to enable determination of a target place where a querying user is located based on geographical location information included in a request of querying for annotation information and a return of annotation information corresponding to the target place to the querying client in response to receiving the request from the querying client.

A place-based information processing apparatus includes: a request receiving unit to receive a request sent by a querying client to query for annotation information, the request carrying geographical location information of a querying user; a target place determination unit to determine a target place where the querying user is located according to the geographical location information; and an annotation information returning unit to determine annotation information corresponding to the target place according to a pre-established correspondence between annotation information and place information, and to return thereof to the querying client.

According to embodiments provided by the present disclosure, the present disclosure has the following technical effects:

Using the embodiments of the present disclosure, a user may utilize an application installed in a mobile terminal device to achieve annotation of specific information content in a place where the user is located, and such information content is not limited to text, but may also include a picture or audio, etc. "Traces" of the user may be kept in the place via various forms of information content, and are not subject to actual conditions in the specific place, which does not need real paper and pen and will not affect the actual scenery of the place.

Apparently, any product implementing the present disclosure does not necessarily achieve all of the above-mentioned advantages at the same time.

BRIEF DESCRIPTION OF THE DRAWINGS

To describe the technical solutions in the embodiments of the present disclosure or existing technologies more clearly, example drawings exemplifying embodiments are briefly introduced herein. Apparently, the drawings in the following description merely represent some embodiments of the present disclosure, and one of ordinary skill in the art may further acquire other drawings according to those drawings without creative efforts.

DETAILED DESCRIPTION

The technical solutions in the embodiments of the present disclosure will be clearly and fully described hereinafter with reference to the accompanying drawings in the embodiments of the present disclosure. Apparently, the described embodiments merely represent some and not all of the embodiments of the present disclosure. All other embodiments acquired by one of ordinary skill in the art based on the embodiments of the present disclosure belong to the protection scope of the present disclosure.

In the embodiments of the present disclosure, an application in a mobile terminal device (for example, a mobile terminal such as a mobile phone, a tablet computer, etc.) may be developed to meet the desire of a user to "put" information such as the mood he/she wants to express, the story he/she wants to share, etc., in a certain place. Thus, even if no paper or pen is provided at the place or pasting and carving are not allowed, the user may leave a "trace" at the place to indicate that he/she has visited there. Although being virtualized and not viewable directly with a naked eye, this type of "trace" may be viewed via a mobile terminal device of the user, which is equivalent to a physical existence and is more in line with the trend of the information age. Exemplary implementations are described in detail hereinafter.

First Embodiment

Figure 1:
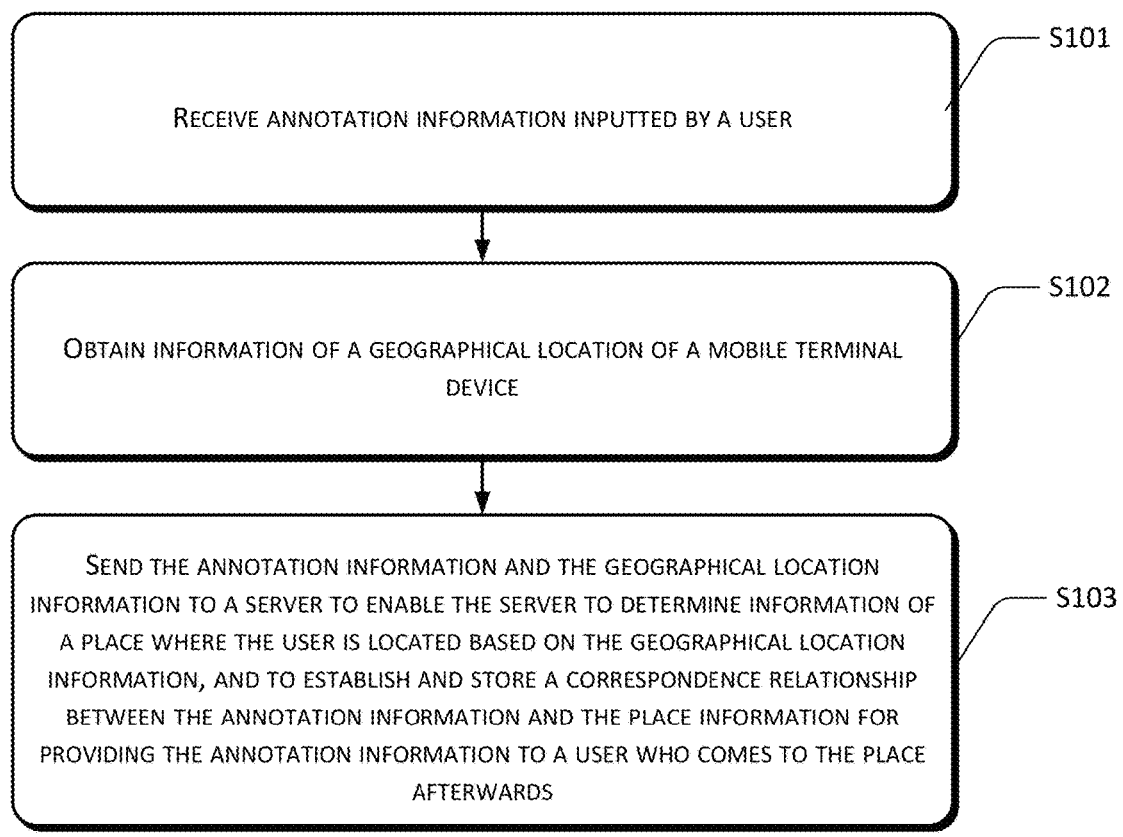
FIG. 1 is a flowchart of a first example method in accordance with the present disclosure.

Referring to FIG. 1, the first embodiment of the present disclosure first provides a place-based information processing method, which may include the following method blocks:

S101 receives annotation information inputted by a user.

In an embodiment of the present disclosure, an executing entity of each method block may be an application developed for a mobile terminal device, and the application may have a client—server architecture. The client may be installed in a mobile terminal device of a user, and is used for interacting with the user. The server runs in a backend server, and provides services such as a database aspect. In an implementation, the application may also be integrated in other application(s). For example, related functions in the embodiments of the present disclosure may also be annotated in an existing instant messaging or social networking application, etc. The first embodiment mainly introduces the solution of the embodiments of the present disclosure from the perspective of a client.

Figure 2:
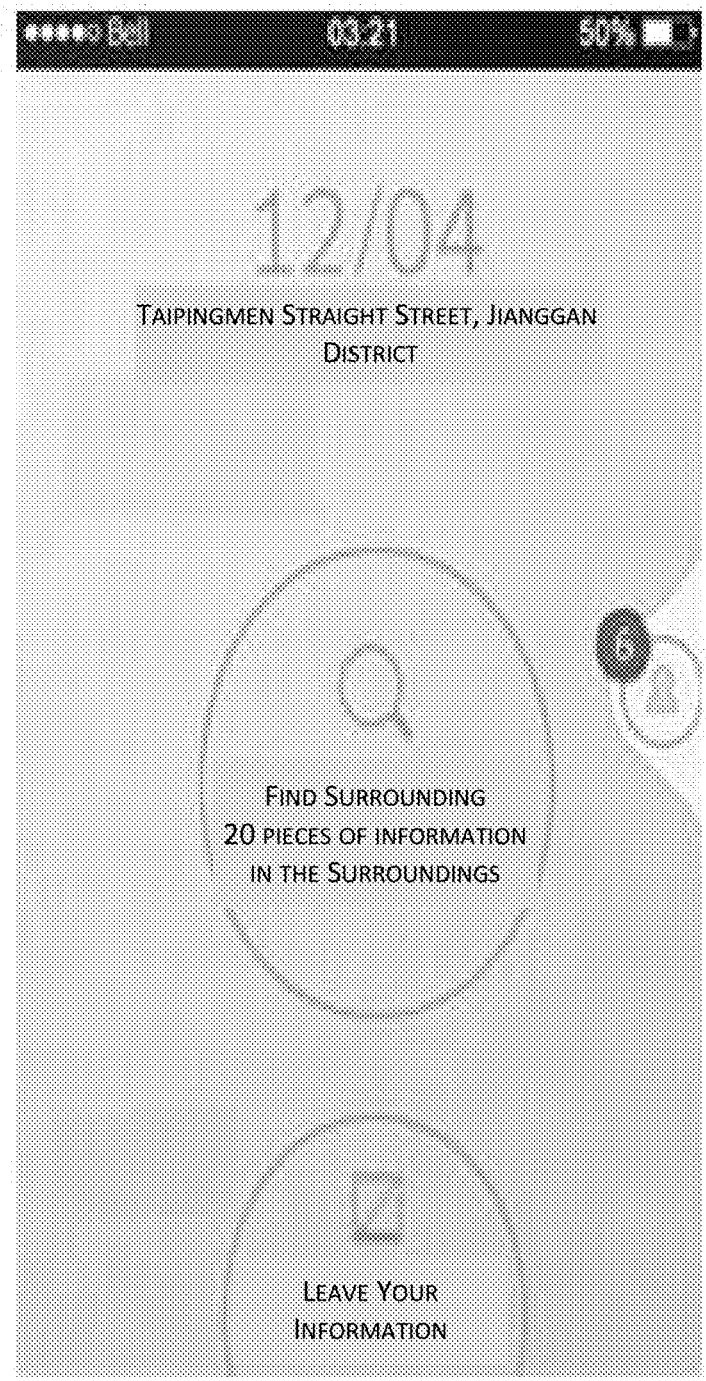
FIG. 2 is a schematic diagram of a first user interface according to an embodiment of the present disclosure.
Figure 3:
FIG. 3 is a schematic diagram of a second user interface according to an embodiment of the present disclosure.

For a client side of an application, an operation entry for the user to annotate information content may be provided no matter in what specific form the application may exist. For example, referring to FIG. 2, after the user enters the application, a user interface as shown in FIG. 2 may be displayed to the user. If the user clicks on "Leave Your Information" in the user interface, a user interface as shown in FIG. 3 may be entered. An edit interface for editing information content may be provided to the user in the user interface as shown in FIG. 3. Specifically, multiple input modes such as text input and voice input may be provided to the user. In other words, the annotation information described in the embodiment of the present disclosure refers to the information that the user needs to "leave" in the place where the user is located. This type of information may exist in various different forms such as text and voice, and may establish an association relationship with the place where the user is located through the application in the terminal device. For example, controls such as a keyboard and an edit box for inputting text content may be provided in a text input/edit interface, and controls (for example, buttons) for adding elements such as pictures and emoticons may further be provided. After the user completes the input, for example, enters a text "New Arrival! Try this delicious coffee from Vietnam", the user may click on a button "Where to put" in the user interface. Correspondingly, the client side of the application may determine the information content currently inputted by the user as the annotation information that needs to be left in the current place.

S102 obtains information of a geographical location of a mobile terminal device.

In response to determining the information content that the user desires to annotate in the current place, information of a current geographical location of the user may further be determined. Apparently, in a real application, this method block S102 may also be performed prior to the method block S101. For example, the geographical location information of the user may be acquired before the user enters specific annotation information, as long as the user accesses the client side of the application.

Specifically, many different approaches may exist for obtaining the geographical location information. For example, existing mobile terminal devices are generally provided with a positioning system such as GPS. Coordinates of the location of the user may be acquired via the positioning system. In addition, positioning methods such as communications base station positioning and WIFI positioning may also be used to determine the geographical location information. Apparently, in an implementation, an operation entry may also be provided to the user for manually entering the geographical location information thereof. In cases when the user does not enable the GPS positioning function or the mobile terminal device thereof is not provided with the GPS positioning function, the user may edit the geographical location information thereof manually.

S103 sends the annotation information and the geographical location information to a server to enable the server to determine information of a place where the user is located based on the geographical location information, and to establish and store a correspondence relationship between the annotation information and the place information for providing the annotation information to a user who comes to the place afterwards.

Upon receiving the annotation information and the geographical location information of the user, the client side may upload these pieces of information to the server, and the server may store these pieces of information. Prior to storing, the server may further determine the place where the user is located based on the geographical location information first. As such, when storing is performed, a correspondence between the annotation information and the place is stored at the end, thereby implementing place-based information annotation and query.

The so-called "place" in the embodiments of the present disclosure may generally include some indoor places such as restaurants and coffee shops, and may also include outdoor places such as tourist attractions. Normally, the locations of such places do not change and have an apparent regional boundary. Furthermore, the probabilities of changes in decorations, settings, objects, etc. in these places are relatively low. For these places, a map database may be created in advance to record a correspondence between each place and a respective range of geographical region. As such, in response to receiving the current geographical location information of the user, a matching thereof against the regional range information of each place stored in the map database may be performed. If the current location of the user is found to be within a range of a certain place, a determination may be made that the user is currently located in that place.

After determining information of the place where the user is currently located, the server may store a correspondence between the annotation information and the place information in a server database. In this way, for the database of the server, multiple similar correspondence relationships may be stored. If other users who comes to the place at a later time, the information content annotated in the place by this user may be viewed. For example, such correspondence relationships may be stored in the database as shown in Table 1:

TABLE 1

| Annotation information | Place information |
|---|---|
| Information content 1 | Place A |
| Information content 2 | Place B |
| . . . | . . . |

A specific form of the information content may be a text, a picture, an audio, etc., or may be a combination of multiple forms, for example, a text and a picture. Specifically, for example, when a user is dining in a restaurant, the user may express his/her mood in a form of a text, and at the same time take a photograph. In this case, the text for expressing the mood and the photograph are equivalent to annotation information that the user wants to leave in the restaurant.

In an implementation, as the number of users who use such function increases, an amount of information content annotated by the users in various places increases continuously, resulting in a continuous increase in the scope of the database. In this case, the stored correspondence relationships may further be managed according to corresponding places. For example, tables may be stored according to places, that is, information content annotated in a same place is stored in a same data table. Correspondingly, information content annotated in different places appears in different data tables, each place corresponding to a data table. In this way, when subsequently providing a user in a certain place with information content annotated by other users, the place may be determined first, and a data table corresponding to the place is then found. Matched information content may be extracted and returned from the data table, thereby enabling a quick search.

In the above implementation, after a user annotates a certain piece of annotation information in a certain place, content of the annotation information annotated by the user in the place (an implementation for a process of viewing annotation information will be described in detail hereinafter) may be viewed by another user using the client side of the application of the embodiment of the present disclosure that is installed in a mobile terminal device thereof when the other user arrives at that place.

As described above, an amount of information content annotated in a same place may be very large over time. In this case, how to provide an effective information filtering/selection mechanism and thus how to make such function more interesting become problems that need to be further considered.

Accordingly, in an exemplary embodiment of the present disclosure, not only the correspondence relationship between the annotation information and the place information of the user may be recorded, but a correspondence relationship between the annotation information and information of a specific annotation position in the place may also be recorded. For example, a certain user labels annotation information on a certain desk in a certain place. When viewing the annotation information subsequently, other users or the user will find that the annotation information is on the desk rather than appearing at other positions in the place. This is closer to a real scenario of leaving a paper note or carving words in a certain place. In an implementation, a correspondence relationship between annotation information and a specific annotation position may be very accurate, for example, having an accuracy up to a particular point, or may be approximately accurate to a particular range. Specific implementations are described in detail hereinafter.

First Implementation

In the first implementation, an annotation position of annotation information may be accurate to a particular area range. When position information is recorded, the position information of annotation may be described using image feature information in a scene area where an associated placement position is located. Specifically, after information content that is inputted by a user and needs to be annotated is received, scene image information in the place may be collected. After the user triggers a put operation, currently collected image feature information may further be uploaded to the server when annotation information and current geographical location information is uploaded. In this way, when recording a correspondence relationship between the annotation information and the place, the server may record the corresponding image feature information into the correspondence relationship.

Figure 4:
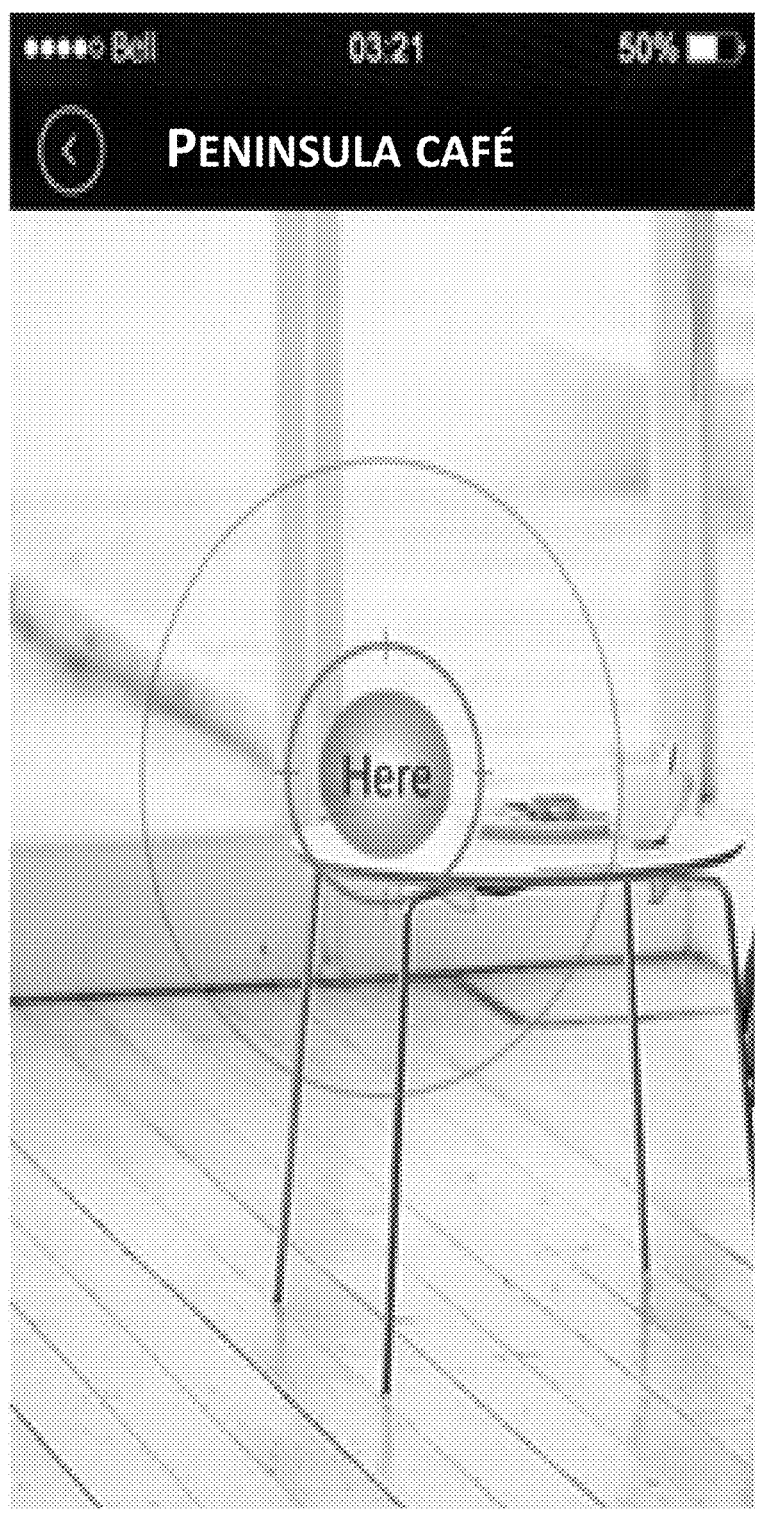
FIG. 4 is a schematic diagram of a third user interface according to an embodiment of the present disclosure.

For example, in order to collect scene image information in a place, an image capturing apparatus of a mobile terminal device of a user may be activated automatically. In this way, an image of a scene in the place that is captured by the image capturing apparatus appears in a user interface of the mobile terminal device, and content of the image in the user interface will continuously change as a viewing angle changes. For example, after the user clicks on the button "Where to put" as shown in FIG. 3, the image capturing apparatus may be activated. A display status at a certain time point may be given as shown in FIG. 4. In a process of displaying the captured image in the user interface, an operable object may further be provided to the user. For example, for a button "here" as shown in FIG. 4, an absolute position of the button in a screen may remain unchanged. As the user changes the viewing angle of the image capturing apparatus, a relative position between the button and the image may remain unchanged. After completing an adjustment of the viewing angle, the user may press the button. A client side of an application is notified via an operation of this operable object to annotate information content inputted thereby to an associated position. Correspondingly, for the client side of the application, after receiving a confirmation message for the annotation from the user, feature information of the image that is currently captured by the image capturing apparatus is extracted as image feature information of the annotation position. The image feature information of the annotation position may then be sent to the server.

Specifically, when extracting the image feature information, feature information in multiple dimensions may be extracted. Examples include a color of each pixel point in the image, a shape or contour of an identifiable object in the image, a texture and a local feature of the image, etc. The so-called identifiable object in the image may generally be an object having a relative regular shape in the image, for example, an electrical appliance (such as a display device, a computer, a television, etc.), furniture (such as a desk, a chair, a stool, a message board, for example), a work of art (such as a vase, a decoration, etc.), and may also be a structural construction such as a statue, a door, a wall, etc. In existing image recognition technologies, some or all parts of a shape and/or a contour of this type of object may be recognized from a captured image. Furthermore, this type of object normally has the following features: (1) a position thereof in the place generally does not change; (2) a relative prominent labeling effect in recognizing specific position information is inherent; and (3) when annotating information, a user may find a certain object according to habits in the real world, and annotate information onto or beside the object. For example, when viewing an image of a current place through a camera, a user finds a display of a computer in the place, and therefore may annotate information content to the upper right corner of the display. Similarly, the user may also annotate information content on an object having a relative regular shape such as an electrical appliance, appliance or a work of art, or may also annotate onto a structural construction.

In short, when extracting image feature information at an annotation position for each piece of annotation information, each piece of the annotation information may correspond to an image feature set, that is, an image is depicted using features in multiple dimensions. After the image feature set is uploaded to the server, the server may add and store thereof into a correspondence relationship between the annotation information and the place information as shown in Table 2.

TABLE 2

| Annotation information | Place information | Image features of annotation position |
|---|---|---|
| Information content 1 | Place A | Image feature set 1 |
| Information content 2 | Place A | Image feature set 2 |
| Information content 3 | Place B | Image feature set 3 |

TABLE 2-continued

| Annotation information | Place information | Image features of annotation position |
| --- | --- | --- |
| Information content 4 | Place B | Image feature set 4 |
| Information content 5 | Place B | Image feature set 5 |
| ... | ... | ... |

In this way, when providing annotation information to a querying user at a later time, the server may not only consider place information, but also image feature information of a specific placement position of the annotation information. For example, when the information content annotated in the place is provided to another user who visits the place at a later time, an image capturing apparatus of that user may be started first to match feature information of an captured image against image features of the annotation position of each piece of the information content in the place. In response to a successful matching, corresponding information content is provided to that user. In other words, a user may see different information content in different capture ranges in a same place. By filtering or selecting information content according to a specific annotation position and a capture range, the user may avoid receiving too much information, and the entire implementation process becomes more interesting and is closer to a real scenario in the real world where "a 'paper note' annotated at a certain position can only be seen at that position".

Specifically, in order to implement a subsequent query operation, the server may create indexes according to image features in various dimensions after receiving an image feature set of each piece of annotation information. Specifically, after receiving a query request, features in image information of a querying party may be extracted from the request, and an image feature set of the image information is matched against the image feature set corresponding to each piece of the annotation information recorded in the database. When performing the matching, the image features may be matched in various dimensions individually. In order to improve a search efficiency, information of the features may be divided into primary feature information and secondary feature information when extracting the information of the features of the image. Generally, the primary feature information is simple and obvious information, for example, information such as a color, a shape or a contour of an object in the image. The secondary feature information generally is in-depth information, including texture, local features, etc. As such, when providing information content to other users at a later time, a primary index of the information content may first be created from each piece of the information content in a current place based on the primary feature information. After a preliminary search, a secondary index is created based on the secondary feature information. Matched information content is found through searching at the end.

The first implementation may make annotation information accurate up to a range of a scene where a placement position thereof is located. For example, an image feature set of a certain piece of annotation information corresponds to an image A. When a querying user uploads information of image features thereof, the image features correspond to an image B. The image A and the image B may be not identical, but a degree of similarity in terms of image features is relatively high. As such, the annotation information is provided to the querying user, and so on. Thus, a querying user may receive a number of pieces of annotation information in a certain field of vision (because a condition is considered to be met as long as a degree of similarity between image feature sets in the field of vision meets a certain requirement). However, since no further position information exists, when such annotation information that meets the condition is displayed to the querying user, each piece of the annotation information may be put at random in the image within the range of the field of vision of the querying user. In other words, the annotation information may only be displayed in an approximate range.

Second Implementation

The foregoing first implementation may achieve an accuracy of a position of placing annotation information up to a range. In the second implementation, in order to further improve the accuracy of a placement position, further processing may be performed when image features are stored. Specifically, an identifiable object in an image may be extracted during image feature extraction, and a user usually selects an object having relatively prominent features and places information at a certain position of the object when performing annotation. Therefore, in the second implementation, if an image is found to include an identifiable object on a basis of image feature extraction, an association relationship between annotation information and the identifiable object may be recorded and sent to the server. In this way, when the correspondence relationship among the annotation information, the place and image feature set is stored, the server may add the association relationship with the identifiable object thereunto.

Specifically, the server may store a correspondence relationship as shown in Table 3 below:

TABLE 3

| Annotation information | Place information | Image feature of identifiable object |
| --- | --- | --- |
| Information content 1 | Place A | Image feature of identifiable object 1 |
| Information content 2 | Place A | Image feature of identifiable object 2 |
| ... | ... | ... |

After the above correspondence relationships are stored according to Table 3, when annotation information is provided to a querying user, the annotation information may be displayed near an associated identifiable object. Specifically, in response to receiving a request from a querying user, various types of image features in the first implementation may be used first to match features in an image captured by the querying user against image features of a respective identifiable object corresponding to each piece of annotation information, determine a matched piece of annotation information, and return the matched piece of annotation information and image features of a corresponding identifiable object to a querying client. The querying client may locate the identifiable object in the currently captured image, and provide each piece of annotation information near the identifiable object. For example, a user is assumed to have annotated a piece of information near a certain display device in a certain place. When an image capturing apparatus of another user captures the display device, that piece of annotation information may be provided to the viewing user and may still be displayed near the display device. Apparently, in this mode, a specific position in the identifiable object where the annotation information is located may not be ascertained. In other words, if a user puts annotation information at the upper right corner of a certain display device, the annotation information may appear at the lower left corner of the display device when the annotation information is finally provided to a querying user, which nevertheless is still displayed near the display device.

Third Implementation

In the third implementation, in order to achieve more accurate positioning, when the annotation information is uploaded, a relative positional relationship between the annotation information and the identifiable object may be further determined, and information of the relative positional relationship may be uploaded to the server. In this way, when storing the correspondence relationship among the annotation information, the place and the image features of the associated identifiable object, the server may add the information of the relative positional relationship thereunto to achieve a matching with more accurate positioning when providing subsequently the annotation information to a querying user.

Specifically, when determining a relative positional relationship between the annotation information and the identifiable object in the image, the specific image may be determined first. When the user specifies an action of placement confirmation, coordinates of a placement point on a display screen of the terminal device may further be recorded. Coordinates of each pixel in the captured image correspond to coordinates of the display screen. Therefore, knowing the coordinates of the placement point on the display screen are known is equivalent to ascertaining specific coordinates of the placement point in the captured image. An identifiable object may then be determined from the captured image. Since an object normally occupies multiple pixels, a pixel point may be selected from among the multiple pixel points to represent a position of the identifiable object. For example, after defining an area where an identifiable object is located, the center of the area may be obtained using a certain algorithm, and the center is used for representing the position of the identifiable object. A coordinate system may then be established using the center as an origin, and coordinates of the annotation information in the coordinate system are determined based on the position of the annotation information in the image. As such, the coordinates may be used to indicate the relative positional relationship between the annotation information and the identifiable object in the image, and may be sent to the server for storage, as shown in Table 4:

TABLE 4

| Annotation information | Place information | Image feature of identifiable object | Relative positional relationship |
|---|---|---|---|
| Information content 1 | Place A | Object feature 1 | Coordinates 1 |
| Information content 2 | Place A | Object feature 2 | Coordinates 2 |
| . . . | . . . | . . . | . . . |

Coordinates in Table 2 above refer to coordinates of a respective position point in which a piece of annotation information is located under the coordinate system using the position point of an identifiable object as the origin. It should be noted that the position of the identifiable object may also be determined according to other rules. For example, not only the center of the area may be selected as described above, but the upper left corner, the lower right corner, etc., of the area may also be selected. However, a specific selection mode is at best to be consistent with a selection mode used during a subsequent query, thereby ensuring the accuracy of matching.

Using the second implementation, when another user comes to the place subsequently and needs to view information content annotated in the surrounding, a matching may be performed first using various types of image features in the first implementation if an image is captured via his/her image capturing apparatus. Upon successful matching, an identifiable object associated with each piece of matched annotation information in the image and corresponding coordinate information may be returned to a querying client. The querying client determines a position point of the identifiable object in a region where the identifiable object is located in the captured image, and then determines a position at which the annotation information needs to be displayed on the identifiable object based on the coordinate information. In this way, if a user annotates a piece of information near a certain display device in a certain place (for example, at the upper right corner), when an image capturing apparatus of another user captures the display device, the annotation information that is labeled at the upper right corner of the display device may still be provided at the upper right corner of the display device for the user to view if a high degree of similarity between other features in the image and the image features of the annotation position of this piece of information content is found through comparison.

In the above implementation, the server adds the image feature information uploaded by the client side directly into the correspondence relationship between the annotation information and the place. In this way, when a user queries for annotation information at a later time, image information uploaded by the querying user may be matched against the image feature information corresponding to each piece of the annotation information. However, in the foregoing implementations, an image feature set corresponding to each piece of annotation information needs to be stored, which occupies a storage space of the server. Furthermore, as the size of the database increases continuously, the time needed for a search also increases, which results in a slow response speed. In addition, in the foregoing implementations, the annotating user may select an annotation position at random. Although the flexibility of the placement operation is improved, this may have the following disadvantages. First, an error may occur during subsequent matching if an image of a scene where an annotation position selected by the user is located is not significantly distinctive. For example, a place where the user annotates may be a white wall, and in this case, features extracted from the image are simple, and the annotation position of the annotation information cannot be determined easily according to the image features. Second, for the image captured by the user and stored in the server side, the quality of the image may be poor and thus subsequent matching may be difficult due to factors such as poor photographing skill of the user on one hand, and no accurate result may be acquired in the matching due to factors such as pixel, etc., in terminal devices used by different users on the other hand. In view of the above factors, other implementations are provided in the embodiments of the present disclosure, which are described below.

Fourth Implementation

In this implementation, the server may perform modeling for each place in advance, and establish an image feature library individually for each place. In the image feature library for each place, image features of one or more landmark objects in the respective place may be stored. The landmark objects may be some furniture or electrical appliances, etc., and these image features may be extracted from photographs of the landmark objects that are captured in advance in the place. When taking photographs of the landmark objects, objects around which user may desire to put their annotation information may be predicted based on a real layout of the place, and these objects are then photographed as representative landmark objects in the place, from which respective features are extracted. A respective set of the extracted image features is used to represent each landmark object. In short, the server may create an image feature library of landmark objects in advance as shown in Table 5:

TABLE 5

| Place information | Image feature of landmark object |
|---|---|
| Place A | Image feature of landmark object 1 |
| Place A | Image feature of landmark object 2 |
| ... | ... |

Each place may have multiple landmark objects, and image features of each landmark object may also be represented by a feature set in multiple dimensions. In this way, in response to receiving annotation information uploaded by an annotating user and image feature information of a corresponding scene, the server may first determine whether the image of the scene includes content that is matched with image feature(s) of a landmark object, and if affirmative, may store a correspondence relationship between the annotation information and an associated place and add an identifier of the matched landmark object into the correspondence relationship. For example, if a certain place includes landmark objects such as a desk, a display device and an air conditioner, etc., and a certain user needs to put annotation information near the display device, a camera of a terminal device may focus on the display device. After a client side uploads the annotation information and image features of the place, the server analyzes the image and detects that the image includes a landmark object—the display device. As such, an identifier corresponding to the display device is read from the image feature library, and added into a current correspondence relationship between the annotation information and the place. An example is shown in Table 6.

TABLE 6

| Annotation information | Place information | Identifier of landmark object |
|---|---|---|
| Information content 1 | Place A | Landmark object 1 |
| Information content 2 | Place A | Landmark object 2 |
| ... | ... | ... |

Subsequently when receiving a request from a querying user to view annotation information in a certain place, a determination may be made as to whether an image uploaded by the querying user includes a certain landmark object in the current place. If included, annotation information corresponding to a matched landmark object may be extracted from an associated correspondence relationship and returned to the querying user. When the annotation information is provided, the annotation information may also be displayed near the landmark object. As can be seen, the correspondence relationship recorded in Table 6 above may achieve a similar or even better effect than the correspondence relationship recorded in Table 3 does, but a storage structure of the former is simpler, which correspondence relationship does not need to store image feature information and only needs to store the associated landmark object.

In this mode, at which positions in a place the annotation information may be put are defined in advance, thereby avoiding problems that may arise due to random annotations of users. In addition, an image feature set uploaded by a user for each piece of the annotation information does not need to be stored correspondingly, thus saving a storage space. For a place, the number of landmark objects stored is not large and is fixed, so that the amount of work needed is basically fixed each time when an image feature matching is performed in response to a request for querying the place. Apparently, in this mode, only an association relationship between annotation information and a landmark object may be determined, and a specific relative positional relationship therebetween is not determined, however. Therefore, annotation information, when being displayed to a querying user, may be displayed at random near a landmark object, thus potentially being inconsistent with an original placement position.

Fifth Implementation

In order to provide a more accurate relative positional relationship between annotation information and a landmark object to a querying user, an approach similar to the one in the third implementation may also be used. In other words, coordinates of a placement point of a piece of annotation information relative to an identifiable object are calculated during a process of uploading image feature information, and stored in the server. Alternatively, in order to simplify this process, the fifth implementation further provides an optimization method.

The fifth implementation is implemented on a basis of the fourth implementation. Specifically, during the process of performing modeling for each place, not only image features of landmark objects are stored for each place, selectable annotation points may also be specified for each landmark object and stored in an image feature library. A position of each annotation point may also be represented by coordinates of the respective annotation point relative to such position as the center of an associated landmark object. In this way, correspondence relationships stored in an image feature library may be given as shown in Table 7 below:

TABLE 7

| Place information | Image feature of landmark object | Position of selectable annotation point |
|---|---|---|
| Place A | Image feature of landmark object 1 | Coordinates of annotation point 1 with respect to landmark object 1 |
| Place A | Image feature of landmark object 1 | Coordinates of annotation point 2 with respect to landmark object 1 |
| ... | ... | ... |

Specifically, a same landmark object in a same place may include multiple selectable annotation points, and coordinates of each annotation point with respect to an associated landmark object are individually recorded in an image feature library.

In this way, upon receiving an annotating request from an annotating user, a landmark object included in an image feature set uploaded by the annotating user is first recognized. Image features of the landmark object and relative coordinates of each selectable annotation point in the landmark object are returned to an annotating client. As such, the annotating client may locate identifiable object(s) included in a currently captured image based on the returned image features, display icon(s) of selectable annotation point(s) at respective position(s) corresponding to the identifiable object(s) according to the coordinates, and provide respective selection operation entr(ies). In this way, the annotating user may select an annotation point, and the client side may upload an identifier of the annotation point selected by the user to the server correspondingly, so that the server may add information about the annotation point selected by the user into a correspondence relationship among the annotation information, an associated place and the landmark object as shown in Table 8:

TABLE 8

| Annotation information | Place information | Identifier of landmark object | Identifier of annotation point |
|---|---|---|---|
| Information content 1 | Place A | Landmark object 1 | Annotation point 1 |
| Information content 2 | Place A | Landmark object 1 | Annotation point 2 |
| ... | ... | ... | ... |

Multiple pieces of annotation information may be labeled at different positions near a same landmark object of a same place. Records of other landmark objects and other places are omitted in Table 8 above.

In this approach, in response to receiving a subsequent request for querying annotation information, the server may first determine whether a matched landmark object in scene image information uploaded by a querying client exists, and if affirmative, may return each piece of annotation information that is associated with the landmark object and coordinate information of corresponding annotation points. Upon receiving thereof, the querying client may determine a position at which each piece of annotation information is displayed based on the landmark object information and the coordinate information of the annotation points, and provide each piece of annotation information at the corresponding position.

As can be seen, a final accuracy of matching between annotation information and an annotation position obtained in this approach is similar to or even higher than that of the approach shown in Table 4. However, a storage structure as shown in Table 8 is simpler and may improve an efficiency of implementation.

A number of implementations are respectively described in detail above. In a real application, any of the above implementations may be selected according to actual needs, which is not limited herein.

In addition, in an implementation, an operation of annotating information content may generally be performed after a user has logged in. In this case, identity information of the annotating user may further be sent to the server, so that the server may add the identity information into a correspondence relationship for storage. In this way, the database stores the following information: what piece(s) of information content is/are annotated in each place, which user(s) annotate(s) such piece(s) of information content, and at which specific position(s) such piece(s) is/are annotated. Subsequently when the information content is provided to other users, not only the annotation position information may be referenced, but a screening may also be performed based on the identity information of the annotating user. For example, only a friend may view details of annotated information content. Alternatively, only a user having the same preferences may view the information content, etc. Information about viewing may further be fed back to the annotating user, for example, a count of the number of friends who have viewed the annotation information published by the user, etc. Apparently, in a real application, a setting may include: users who are not friends are also allowed to view annotation information of each other. In this case, identity information of a viewer may further be displayed to the annotating user, and the user may be prompted to add him/her as a friend, etc.

Under a circumstance that identity information of a user is stored, correspondence relationship in the database may be given as shown in Table 9:

TABLE 9

| Information content | Place information | Image feature of annotation position | Identifier of annotating user |
|---|---|---|---|
| Information content 1 | Place A | Image feature set 1 | User X |
| Information content 2 | Place A | Image feature set 2 | User Y |
| ... | ... | ... | ... |

In short, through the embodiment of the present disclosure, a user may utilize an application installed in a mobile terminal device thereof to annotate specific information content in a place where the user is located. This type of information content is not limited to text but may also be a picture or voice, etc. "Traces" of the user may therefore be left in the place via various forms of information content. Such "traces" may reflect the feeling that has been expressed by the user or record what the user has seen and heard in the place in a certain a moment of the past, and are not subject to any real condition in the specific place, which does not need real paper and pen and does not affect the actual scenery of the place.

Second Embodiment

The foregoing first embodiment mainly describes the embodiments of the present disclosure from a perspective of how to annotate information content in detail. The second embodiment mainly describes a perspective of how to query annotation information. Method blocks are still performed by a client side of an application. In a real application, the client side may be the same as the client side mentioned in the first embodiment. In other words, a same client side may implement a function of annotating information in a place, and a function of viewing annotation information of other users in the place.

Figure 5:
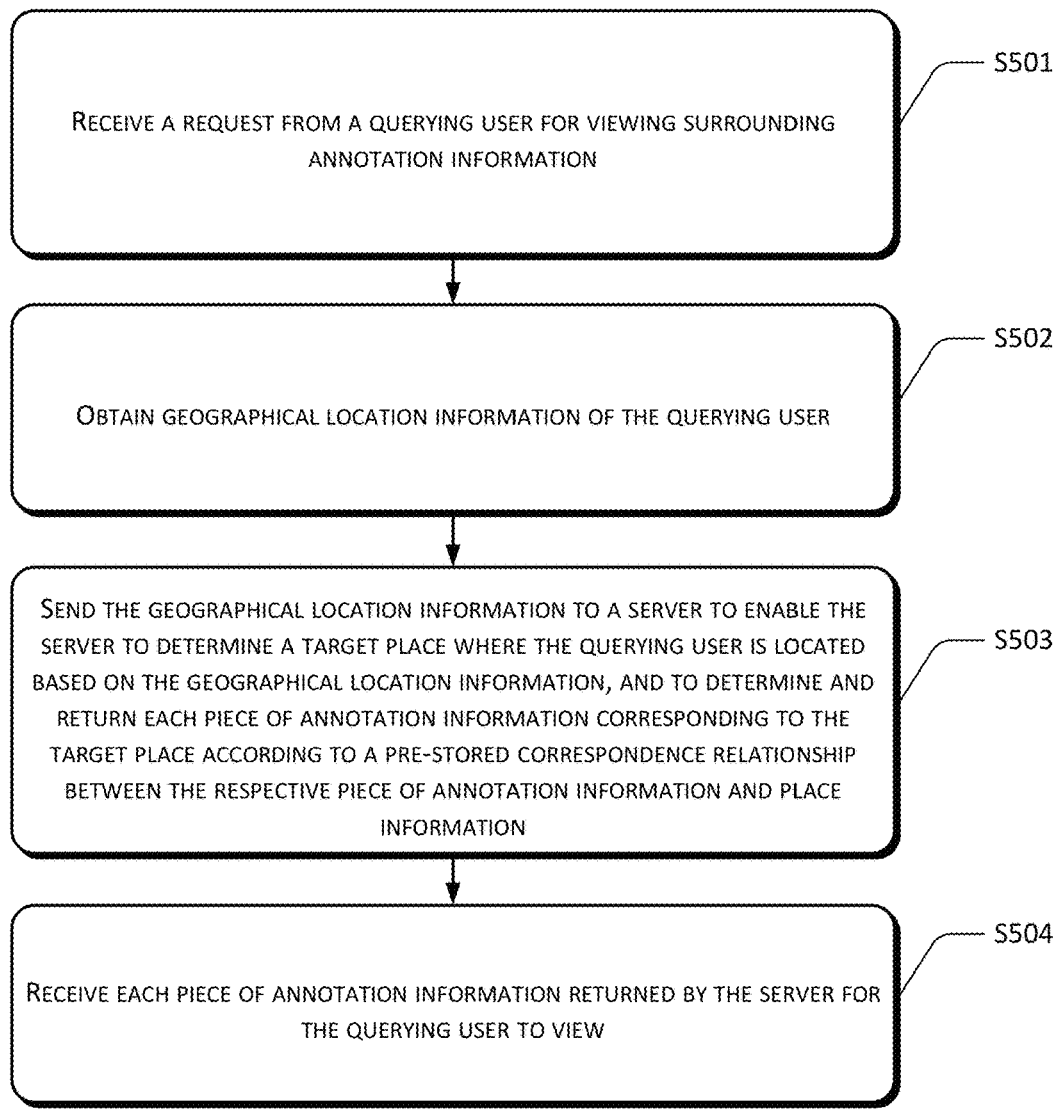
FIG. 5 is a flowchart of a second example method in accordance with the present disclosure.

Referring to FIG. 5, the second embodiment of the present disclosure provides a place-based information processing method, which may include the following method blocks:

S501 receives a request from a querying user for viewing surrounding annotation information.

When a user starts a client side of an application, the client side may receive a request of the user to view annotation information in a current place. Apparently, after a user interface of the application is accessed, respective operation entries of two functions may also be provided in the interface. For example, referring to FIG. 2, besides displaying an operation entry of "Leave Your Information", an operation entry of "Find Surrounding" may also be displayed. Furthermore, an operation of clicking on the operation entry of "Find Surrounding" by the user in the user interface as shown in FIG. 2 may be taken as a request of the user to view surrounding information content.

S502 obtains geographical location information of the querying user.

In response to receiving the request for viewing surrounding information content, the geographical location information of the user may also be acquired first. Apparently, in a real application, the method block S502 may also be performed before the method block S501. A specific process of implementation is similar to that in the first embodiment, and is not described in detail herein.

S503 sends the geographical location information to a server to enable the server to determine a target place where the querying user is located based on the geographical location information, and to determine and return each piece of annotation information corresponding to the target place according to a pre-stored correspondence relationship between the respective piece of annotation information and place information.

Since a correspondence relationship between information content annotated by each user and a place is stored in a database of the server when users annotate information content, a request to view the information content annotated in the current place may be sent to the server so that the server may acquire each piece of annotation information corresponding to the place and return thereof to the querying client side upon determining information of the place.

S504 receives each piece of annotation information returned by the server for the querying user to view.

Each piece of annotation information corresponding to the place, after being acquired, may be provided to the current user. Specifically, such information content may be provided in many different forms. For example, each piece of the information content may be presented directly, or prompt information (for example, an icon, etc., with different types of annotation information potentially using different icons, for example, voice annotation information may be represented by an icon of a "horn", and text annotation information may be represented by an icon of "the ellipses", etc.) of each piece of the information content may be provided in the user interface in the form of a list first. After the user clicks to view a certain piece of prompt information, details of information content corresponding to that piece of prompt information are presented to the user.

Apparently, if the database has further stored specific annotation position information of the information content in the place, image information in the place may also be captured first and then sent to the server when providing the information content annotated in the place by other users to the user. When querying annotation information in the place, the server may also find and return annotation information at a corresponding annotation position according to the image information. For example, if the server stores image feature information corresponding to each piece of annotation information, image feature information associated with an annotation position of each piece of annotation information in the place where the user is currently located may be acquired from the database. Furthermore, feature information of a currently captured image is matched against the image feature information of the annotation position corresponding to each piece of annotation information. Alternatively, image feature information of an identifiable object that is associated with each piece of annotation information may be received from the server, and each piece of annotation information is displayed near the identifiable object in the currently captured scene image accordingly. Alternatively, image feature information of an identifiable object that is associated with each piece of annotation information and information of a relative positional relationship between each piece of annotation information and the identifiable object may be received from the server. Each piece of annotation information is then displayed at a position corresponding to the identifiable object in the currently captured scene image.

Figure 6:
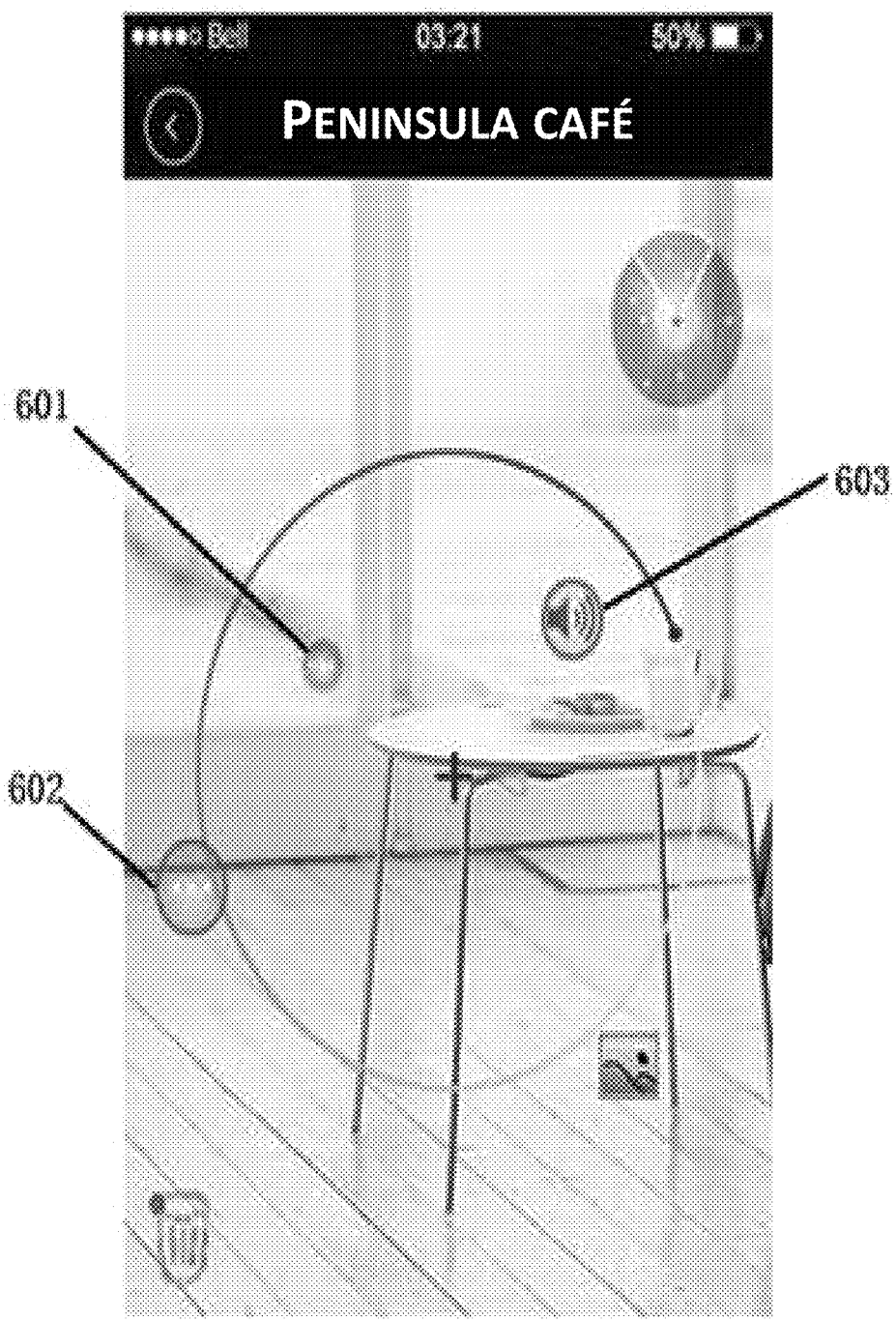
FIG. 6 is a schematic diagram of a fourth user interface according to an embodiment of the present disclosure.
Figure 7:
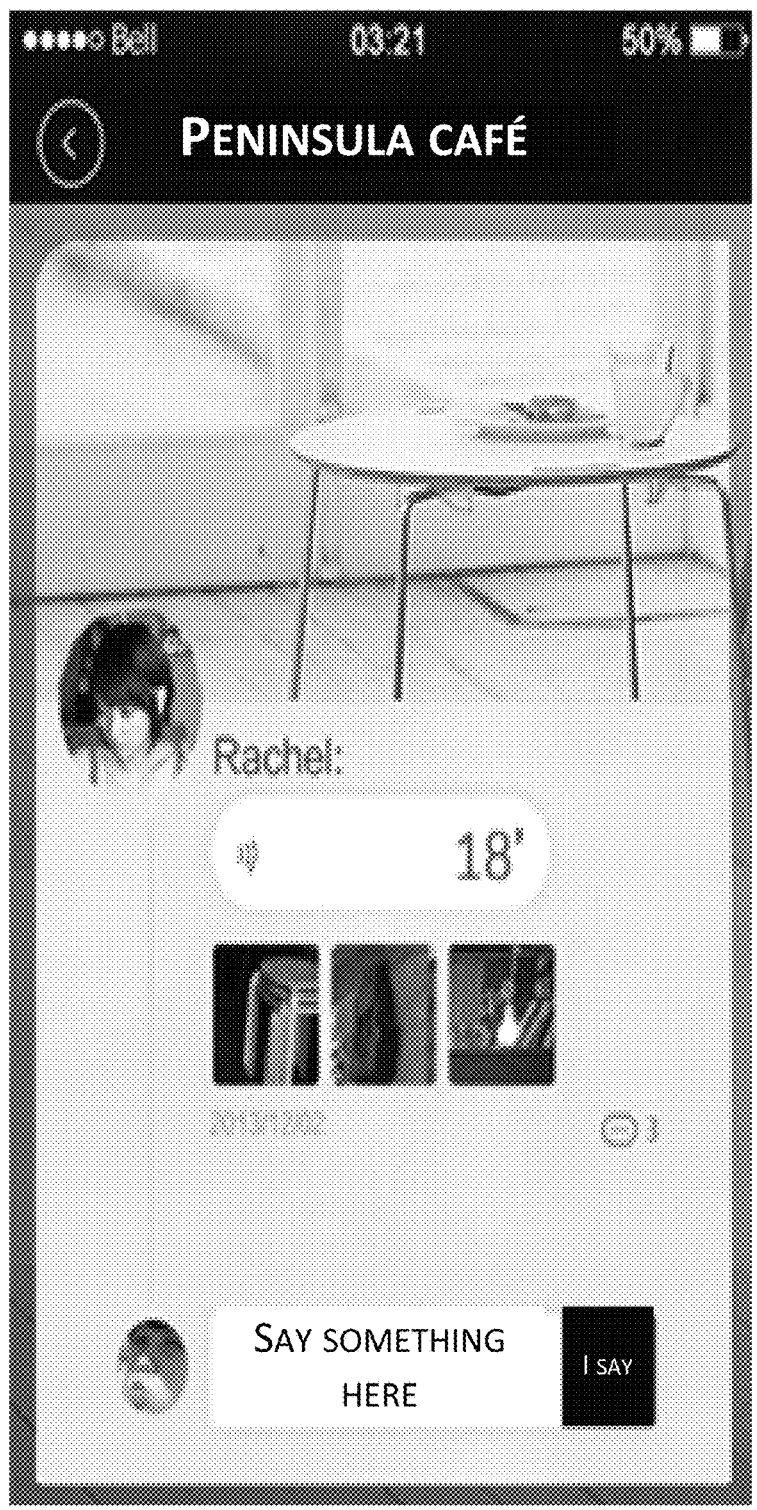
FIG. 7 is a schematic diagram of a fifth user interface according to an embodiment of the present disclosure.

When providing information content annotated by the other users in the current place to a viewing user according to an image of a specific annotation position of the information content, another image layer may be created on top of the captured image layer, and an identifier of annotation information in a current field of vision is displayed at this image layer. For example, as shown in FIG. 6, after the user clicks on the button "Find Surrounding Information" in FIG. 2, the image capturing apparatus of the mobile terminal device may be activated automatically. A background image in FIG. 6 is an image within a current range of capture, and identifier information 601, 602 and 603 displayed thereon corresponds to identifier information of information content annotated in the range of capture. If the user clicks on identifier information corresponding to the identifier information 601, details of corresponding information content may be presented. As shown in FIG. 7, the information content may include a user name of an annotating user, such as "Rachel", and what the user annotates in the place is a piece of voice information. Accordingly, a playback button for playing the voice information may further be provided in the details page.

If a search result corresponds to a failure of finding an image having the similar annotation position, which is equivalent to no other users having annotated information content in the current range of capture of the user, the user may be prompted to adjust a capturing angle and change the range of capture in this case, as information content annotated by users may be found in other ranges of capture.

In addition, in an implementation, for each user of an application provided in the embodiments of the present disclosure, an account thereof may normally be registered in the application, and a specific operation of annotating information content or viewing information content of other users may be performed after logging in using identity information for his/her own account. In other words, for each user, whether he/she is an annotator or a viewer of information content, an associated system is capable of acquiring the identity information of the user. In addition, in a real application, a friendship relationship may be established among users. Therefore, in other embodiments of the present disclosure, information content may be viewed among friends. Specifically, information content annotated by a user in a certain place may be viewed only by friends of the user. Correspondingly, when a user needs to view information content annotated by other users in a certain place, the user may only view information content annotated by his/her friends in the place. In an implementation, when a correspondence relationship between annotated information content and place information is stored, identity information of an annotating user may also be stored as shown in Table 3. In this way, when a request of a certain user to view information content annotated in a current place is received, identity information of buddy users of the current user may be acquired first, and identity information of an annotating user of each piece of information content in the place where the user is currently located is further acquired from the database of the server. A determination is then made as to whether a buddy user of the current viewing user is included therein. If affirmative, information content annotated by the buddy user of the current user in the current place may be provided to the current user.

Third Embodiment

The foregoing first embodiment and second embodiment describe the technical solutions of the present disclosure mainly from the perspective of a client side. A solution from the perspective of a server is described hereinafter. In the third embodiment, details of an implementation process of a server side in a process of performing annotation by an annotating user are described.

Figure 8:
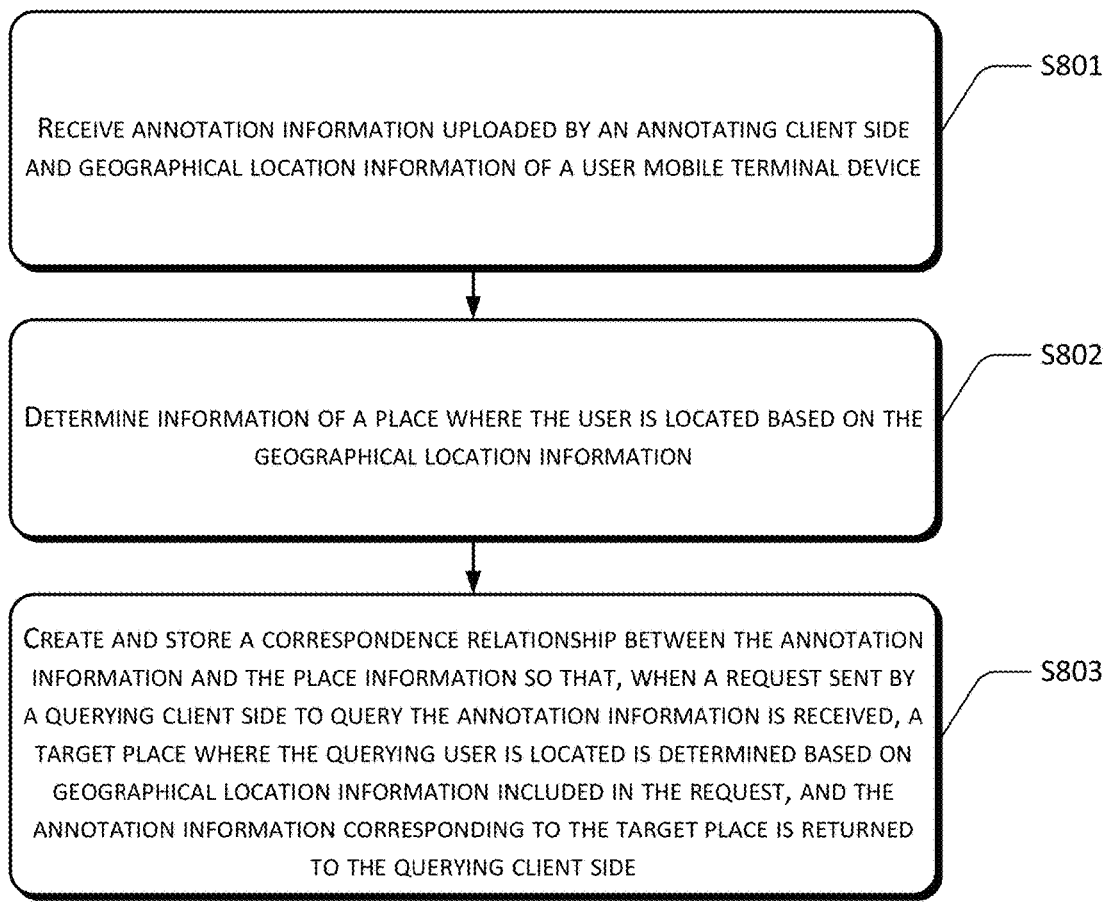
FIG. 8 is a flowchart of a third example method in accordance with the present disclosure.

Referring to FIG. 8, the third embodiment provides a place-based information processing method, which may include the following method blocks:

S801 receives annotation information uploaded by an annotating client side and geographical location information of a user mobile terminal device.

S802 determines information of a place where the user is located based on the geographical location information.

S803 creates and stores a correspondence relationship between the annotation information and the place information so that, when a request sent by a querying client side to query the annotation information is received, a target place where the querying user is located is determined based on geographical location information included in the request, and the annotation information corresponding to the target place is returned to the querying client side.

In order to acquire a precise annotation position to perform matching more accurately, the server may further receive annotation position information of the annotation information in the place that is uploaded by the annotating client side, add and store the annotation position information into the correspondence relationship. In this way, after receiving the request for querying the annotation information, the server may match scene position information uploaded by the querying client side against the annotation position information corresponding to each piece of annotation information in the target place, and return the matched annotation information to the querying client side.

In an implementation, the annotation position information may be image feature information of a scene image in the place that is uploaded by the annotating client side. Alternatively, the annotation position information may be image feature information of an identifiable object included in a scene image in the place that is uploaded by the annotating client side, so that the position of the annotation information may be accurate to up a point near a specific identifiable object. Alternatively, the annotation position information may be image feature information of an identifiable object included in a scene image in the place uploaded by the annotating client side and relative positional relationship information between the annotation information and the identifiable object.

In another implementation, the server may create a first image feature library for the place in advance. The first image feature library stores an identifier of at least one landmark object in the place and corresponding image feature(s). In this case, when image feature information of a scene image in the place that is uploaded by an annotating client side is received, a determination may be made as to whether a certain landmark object in the place is included. If affirmative, an identifier of that landmark object is taken as the annotation position information of the annotation information in the place.

Alternatively, a second image feature library may be created for the place in advance. The second image feature library stores an identifier of at least one landmark object in the place corresponding image feature(s), and relative coordinate information of at least one selectable annotation point in each landmark object relative to the respective landmark object. In this case, when image feature information of a scene image in the place that is uploaded by an annotating client side is received, a determination may be made as to whether a certain landmark object in the place is included therein. If affirmative, image feature(s) of that landmark object and relative coordinate information of annotation point(s) are returned. After receiving information of a selected annotation point that is uploaded by the annotating client side, the identifier of the landmark object and the information of the annotation point are taken as the annotation position information of the annotation information.

Fourth Embodiment

The fourth embodiment mainly describes an implementation of the server side from the perspective of supporting enquiries of a querying party in detail.

Figure 9:
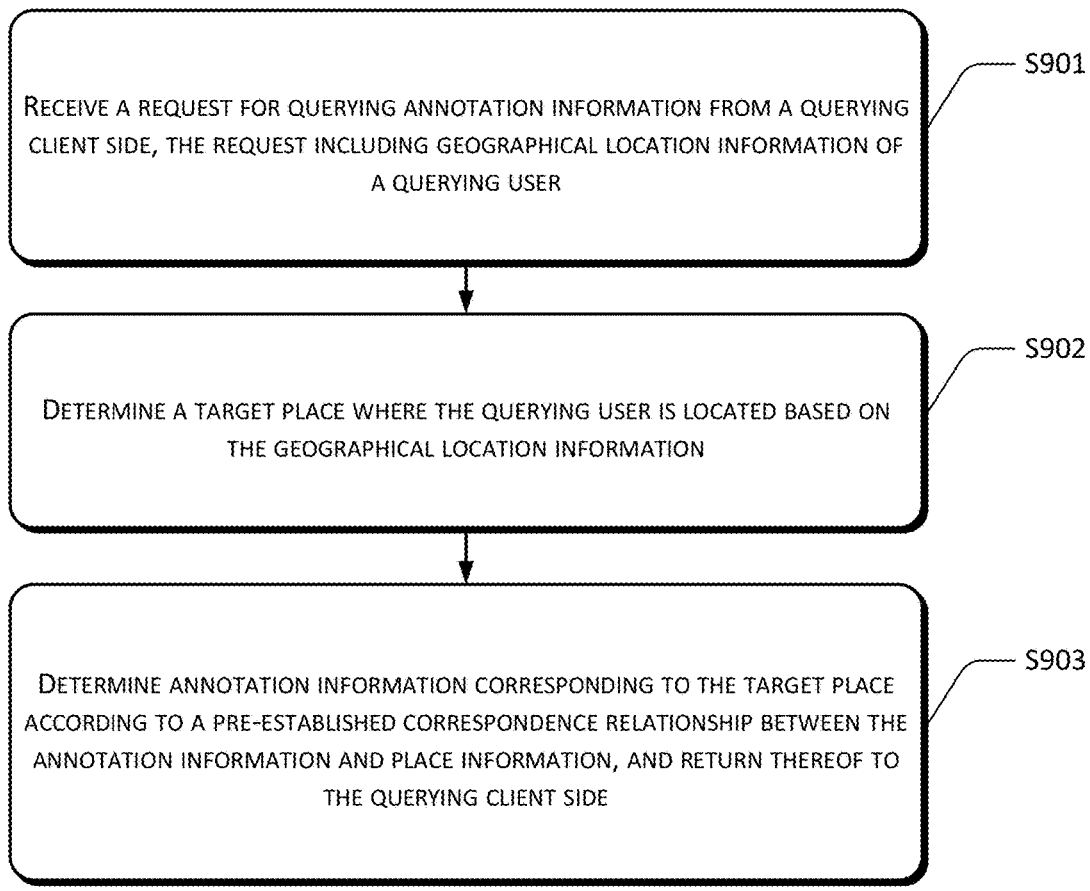
FIG. 9 is a flowchart of a fourth example method in accordance with the present disclosure.

Referring to FIG. 9, the fourth embodiment provides a place-based information processing method, which may include the following method blocks:

S901 receives a request for querying annotation information from a querying client side, the request including geographical location information of a querying user.

S902 determines a target place where the querying user is located based on the geographical location information.

S903 determines annotation information corresponding to the target place according to a pre-established correspondence relationship between the annotation information and place information, and returns thereof to the querying client side.

The correspondence relationship may further include annotation position information of the annotation information in the place. In this case, scene position information of the querying user in the current place may be further acquired. Matched annotation information is then acquired based on annotation position information corresponding to each piece of the annotation information, and the matched annotation information is returned to the querying client side to enable the querying client side to provide the annotation information at the corresponding annotation position.

Specifically, the annotation position information may be image feature information of a scene image in the place that is uploaded by an annotating client side. In this case, image feature information of a scene image in the place that is uploaded by the querying client side may be received, and the received image feature information is compared with image feature information corresponding to each piece of annotation information to acquire matched annotation information.

Alternatively, the annotation position information may be image feature information of an identifiable object in the place. In this case, image feature information of a scene image in the place that is uploaded by the querying client side may be received. A determination may then be made as to whether an identifiable object exists based on the received image feature information. If affirmative, image feature(s) of the identifiable object is/are compared with image feature(s) of a respective identifiable object that corresponds to each piece of annotation information to acquire matched annotation information. The image feature information of the identifiable object may be uploaded by the annotating client side, or may be stored in an image feature library created in advance by the server side, and an associated correspondence relationship stores an identifier of the identifiable object.

The annotation position information may also include image feature information of an identifiable object in the place, and relative positional information between the annotation information and the identifiable object. In this case, image feature information of a scene image in the place that is uploaded by the querying client side may be received, and a determination is made as to whether an identifiable object exists based on the received image feature information. If affirmative, image feature(s) of the identifiable object is/are compared with image feature(s) of a respective identifiable object that corresponds to each piece of annotation information to acquire matched annotation information. The image feature information of the identifiable object corresponding to the matched annotation information and corresponding relative positional relationship information is returned to the querying client side. The image feature information of the identifiable object and the relative positional relationship information may be uploaded by the annotating client side, or may be stored in an image feature library established in advance by the server side. An associated correspondence relationship stores an identifier of the identifiable object and an identifier of an annotation point.

It should be noted that implementation details of the foregoing second, third and fourth embodiments may be referenced to the description in the first embodiment, which are not described in detail herein.

Figure 10:
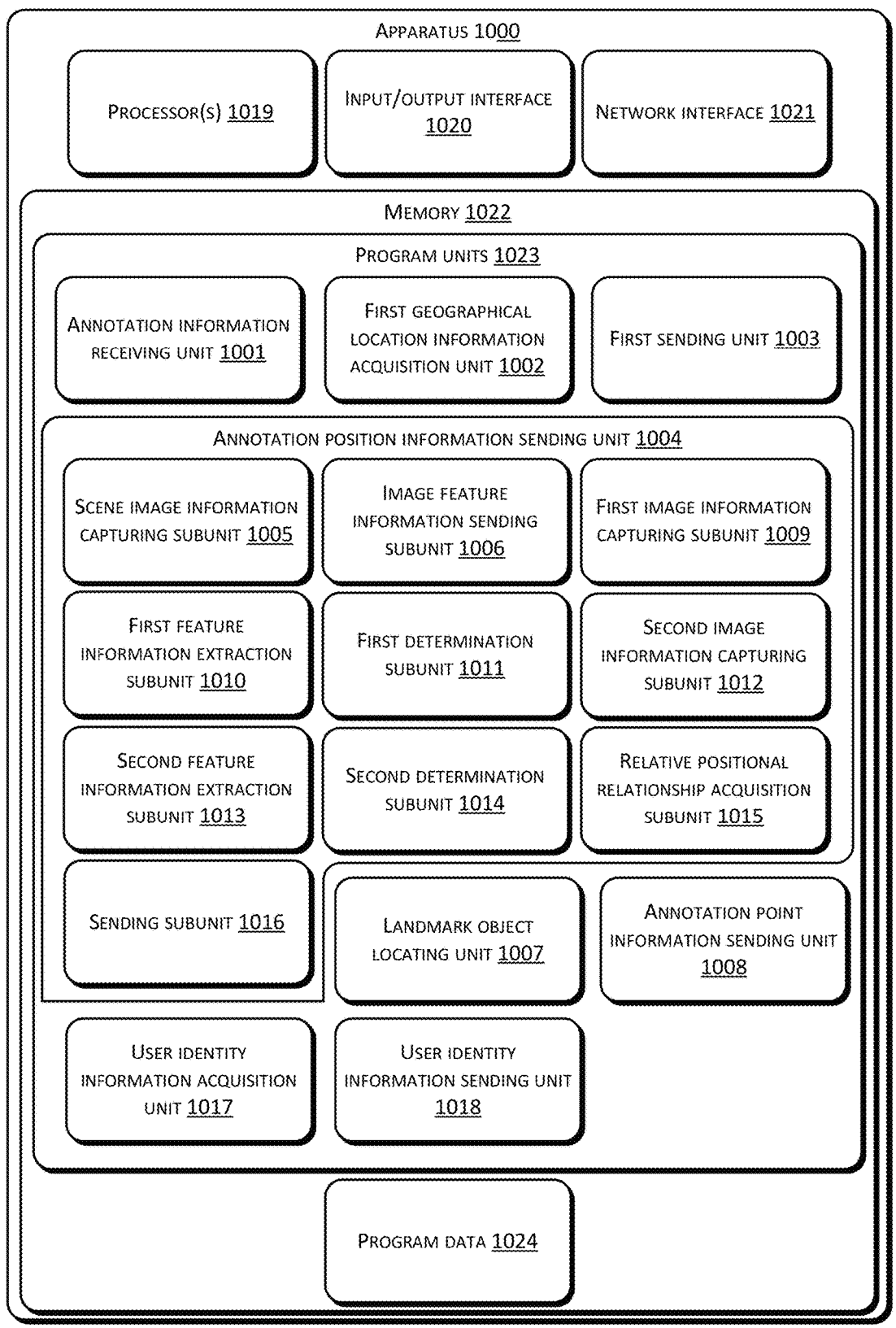
FIG. 10 is a schematic diagram of a first example apparatus in accordance with the present disclosure.

Corresponding to the place-based information processing method provided in the first embodiment of the present disclosure, an embodiment of the present disclosure further provides a place-based information processing apparatus 1000. Referring to FIG. 10, the apparatus 1000 may include:

an annotation information receiving unit 1001 to receive annotation information inputted by a user;

a first geographical location information acquisition unit 1002 to acquire geographical location information of a mobile terminal device; and a first sending unit 1003 to send the annotation information and the geographical location information to a server to enable the server to determine information of a place where the user is located based on the geographical location information, to create and store a correspondence relationship between the annotation information and the information of the place for providing the annotation information to a querying user in the place.

In an implementation, in order to provide the annotation information at a more accurate position, the apparatus 1000 may further include:

an annotation position information sending unit 1004 to send information of an annotation position of the annotation information in the place to the server for adding the information of the annotation position into the correspondence relationship for storage, and provide the annotation information to the querying user who is in the place and whose field of vision includes the annotation position.

The annotation position information sending unit 1004 may include:

a scene image information capturing subunit 1005 to capture scene image information in the place before or after receiving the annotation information inputted by the user; and an image feature information sending subunit 1006 to extract feature information of the captured scene image in response to receiving an annotation confirmation message, and send the feature information to the server as the annotation position information.

The server adds the received image feature information into the correspondence relationship for storage.

Alternatively, the server creates a first image feature library for the place in advance. The first image feature library stores an identifier of at least one landmark object in the place and a corresponding image feature. After receiving an image feature of the scene image, the server determines whether a certain landmark object in the place is included therein. If affirmative, the identifier of the landmark object is added into the correspondence relationship for storage.

Alternatively, the server establishes a second image feature library for the place in advance. The second image feature library stores an identifier of at least one landmark object in the place, a corresponding image feature, and relative coordinate information of at least one selectable annotation point in each landmark object relative to the respective landmark object. After receiving an image feature of the scene image, the server determines whether a certain landmark object in the place exists therein. If affirmative, an image feature of the landmark object and relative coordinate information of an associated annotation point are returned.

The apparatus 1000 may further include:

a landmark object locating unit 1007 to locate the landmark object in the currently captured scene image based on the received image feature of the landmark object, and display each selectable annotation point on top of the scene image according to the relative coordinate information; and an annotation point information sending unit 1008 to send information about a selected annotation point to the server after receiving a selection operation of the user to allow the server to add and store the identifier of the landmark object and the information of the selected annotation point into the correspondence relationship as the annotation position information of the annotation information.

In another implementation, the annotation position information sending unit 1004 may include:

a first image information capturing subunit 1009 to capture scene image information in the place before or after the annotation information inputted by the user is received;

a first feature information extraction subunit 1010 to extract feature information of the currently captured scene image in response to receiving an annotation confirmation message;

a first determination subunit 1011 to determine whether the feature information includes an image feature of an identifiable object, and send the image feature of the identifiable object to the server as the annotation position information if affirmative.

Alternatively, in another implementation, the annotation position information sending unit 1004 may include:

a second image information capturing subunit 1012 to capture scene image information in the place before or after the annotation information inputted by the user is received;

a second feature information extraction subunit 1013 to extract feature information of the currently captured scene image in response to receiving an annotation confirmation message; and a second determination subunit 1014 to determine whether the feature information includes an image feature of an identifiable object;

a relative positional relationship acquisition subunit 1015 to acquire relative positional relationship information between the annotation information and the identifiable object in response to a determination result of the second determination subunit being affirmative;

a sending subunit 1016 to send image feature information of the identifiable object and the relative positional relationship information to the server as the annotation position information.

In an implementation, the relative positional relationship acquisition subunit 1015 may determine a position of a position point that is representative the identifiable object in the scene image, determine a position of an annotation position point of the annotation information on a display screen of the terminal device according to an operation of the user, use the position point of the identifiable object as an origin to establish a coordinate system, determine coordinates of the annotation position point in the coordinate system, and use the coordinates as the relative positional relationship information between the annotation information and the identifiable object.

In a real application, the apparatus 1000 may further include:

a user identity information acquisition unit 1017 to acquire identity information of the user;

a user identity information sending unit 1018 to send the identity information of the user to the server to allow the server to add and store the identity information into the correspondence relationship.

In an embodiment, the apparatus 1000 may further include one or more processors 1019, an input/output interface 1020, a network interface 1021 and memory 1022.

The memory 1022 may be a form of computer readable media, e.g., a non-permanent storage device, random-access memory (RAM) and/or a nonvolatile internal storage, such as read-only memory (ROM) or flash RAM. The memory is an example of computer readable media. The computer readable media may include a permanent or non-permanent type, a removable or non-removable media, which may achieve storage of information using any method or technology. The information may include a computer-readable command, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In an embodiment, the memory 1022 may include program units 1023 and program data 1024. The program units 1023 may include one or more of the foregoing units and/or subunits as described in the foregoing embodiments of the apparatus 1000.

Figure 11:
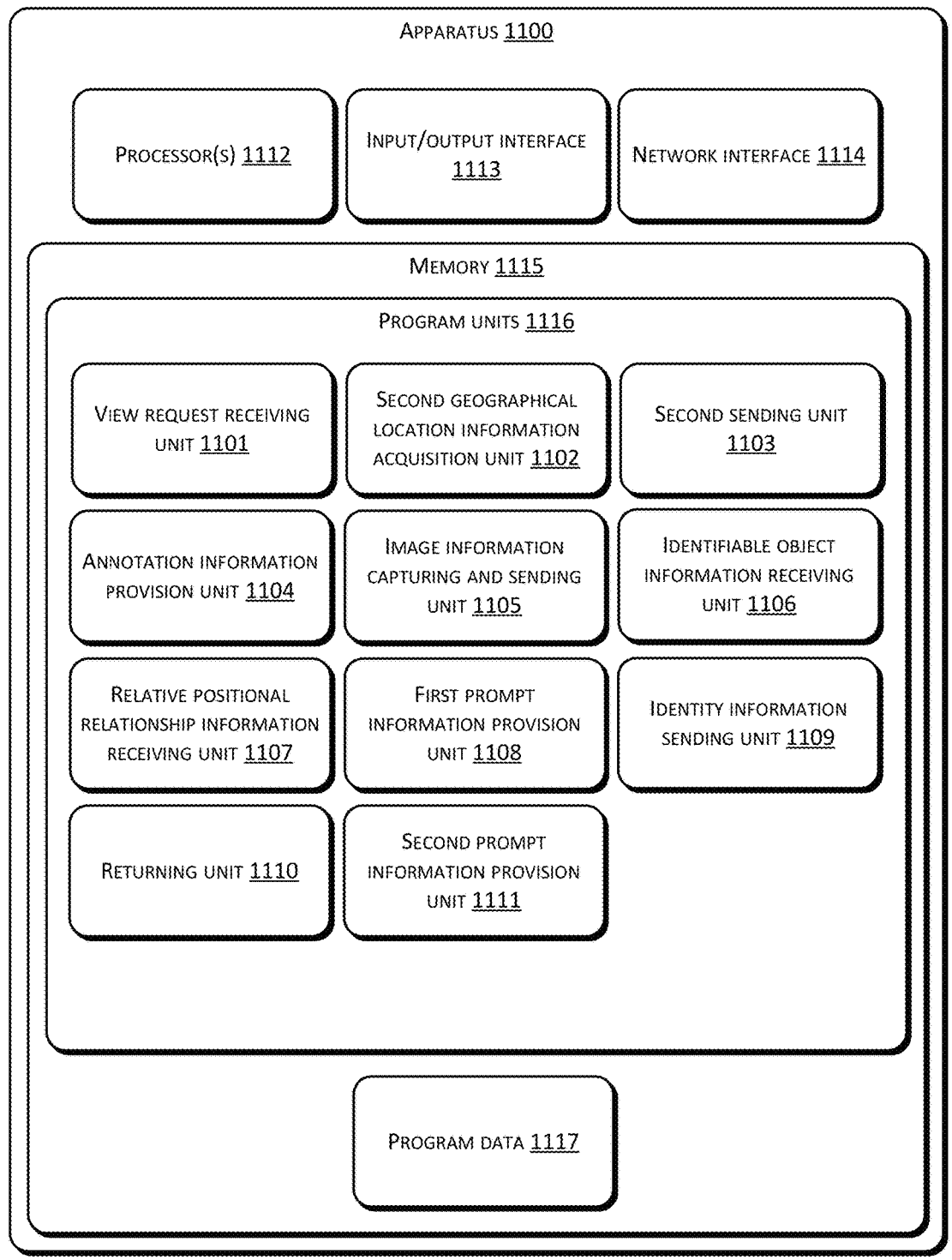
FIG. 11 is a schematic diagram of a second example apparatus in accordance with the present disclosure.

Corresponding to the place-based information processing method provided in the second embodiment of the present disclosure, an embodiment of the present disclosure further provides a place-based information processing apparatus 1100. Referring to FIG. 11, the apparatus 1100 may include:

a view request receiving unit 1101 to receive a request for viewing surrounding annotation information from a querying user;

a second geographical location information acquisition unit 1102 to acquire geographical location information of the querying user;

a second sending unit 1103 to send the geographical location information to a server to enable the server to determine a target place where the querying user is located based on the geographical location information, and to determine and return each piece of the annotation information corresponding to the target place based on a pre-stored correspondence relationship between the respective piece of the annotation information and place information;

an annotation information provision unit 1104 to provide each piece of the annotation information returned by the server to the querying user.

The server further stores annotation position information corresponding to each piece of the annotation information. The apparatus 1100 may further include:

an image information capturing and sending unit 1105 to capture and send scene image information in the place to the server to facilitate the server to determine and return annotation information that is in the place and within a field of vision of the querying user according to the scene image information received thereby.

In an implementation, the apparatus 1100 may further include:

an identifiable object information receiving unit 1106 to receive image feature information of an identifiable object that is associated with each piece of the annotation information returned by the server, and display each piece of the annotation information near the identifiable object in the currently captured scene image accordingly.

In addition, the apparatus 1100 may further include:

a relative positional relationship information receiving unit 1107 to receive image feature information of an identifiable object that is associated with each piece of the annotation information returned by the server and relative positional relationship information between each piece of the annotation information and the identifiable object, and display each piece of the annotation information at a position corresponding to the identifiable object in the currently captured scene image accordingly.

In addition, the apparatus 1100 may further include:

a first prompt information provision unit 1108 to provide first prompt information if the information returned by the server does not include matched annotation information, the first prompt information being used for prompting the user to change the field of vision.

If the server further stores identity information of an annotating user of information content, the apparatus 1100 may further include:

an identity information sending unit 1109 to send identity information of the querying user to the server to facilitate the server to acquire identity information of buddy users of the querying user, to acquire identity information of an annotating user of each piece of the information content in the place where the user is currently located, and to determine whether a friend user of the querying user exists; and a returning unit 1110 to return annotation information of the buddy user of the querying user in the place if affirmative.

In addition, the apparatus 1100 may further include:

a second prompt information provision unit 1111 to provide second prompt information to the querying user, the second prompt information being used for indicating that the querying user is allowed to leave annotation information in the current place.

In an embodiment, the apparatus 1100 may further include one or more processors 1112, an input/output interface 1113, a network interface 1114 and memory 1115. The memory 1115 may include a form of computer-readable media as described in the foregoing description.

In an embodiment, the memory 1115 may include program units 1116 and program data 1117. The program units 1116 may include one or more of the foregoing units and/or subunits as described in the foregoing embodiments of the apparatus 1100.

Figure 12:
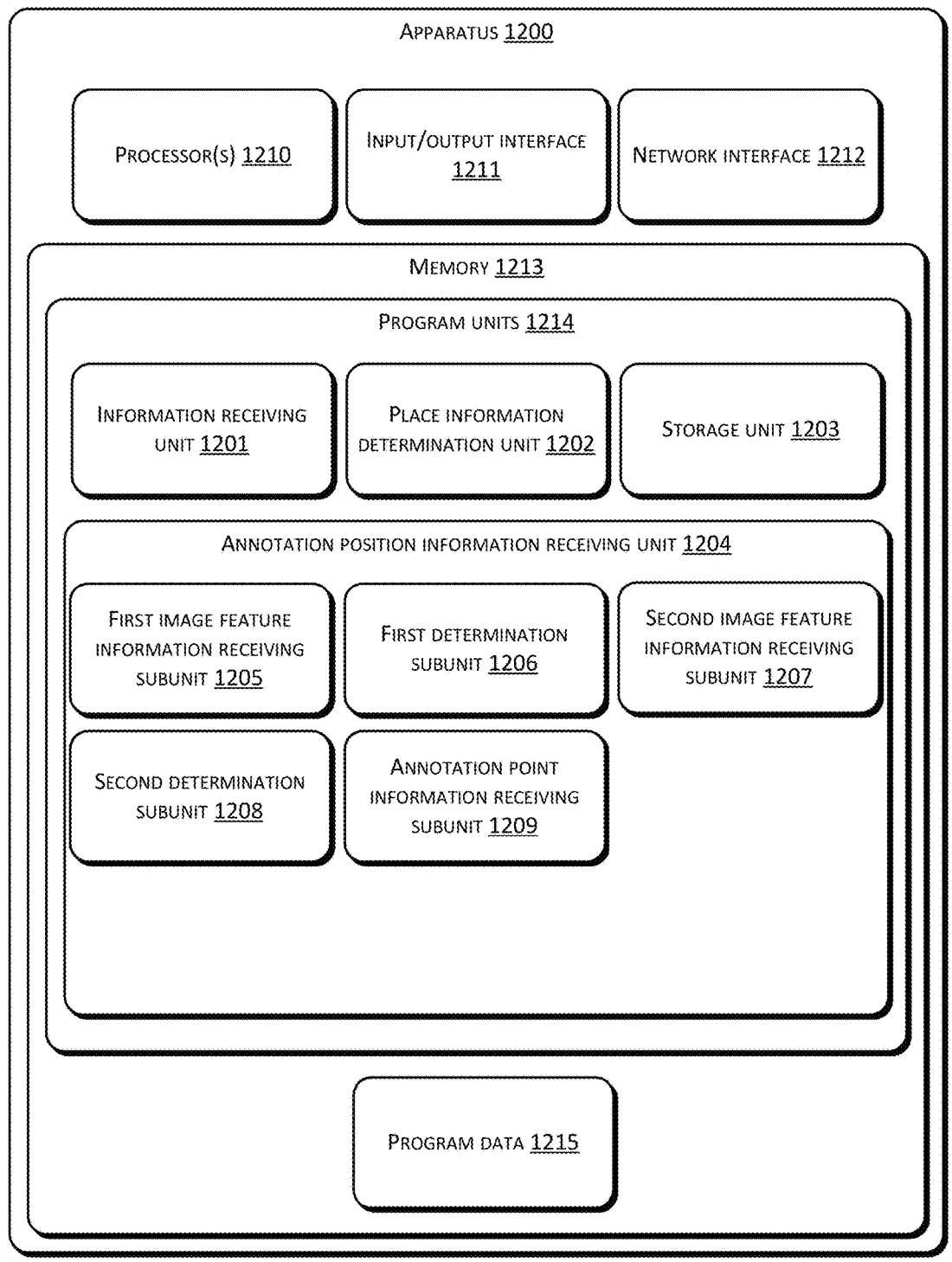
FIG. 12 is a schematic diagram of a third example apparatus in accordance with the present disclosure.

Corresponding to the place-based information processing method provided in the third embodiment of the present disclosure, an embodiment of the present disclosure further provides a place-based information processing apparatus. Referring to FIG. 12, the apparatus 1200 may include:

an information receiving unit 1201 to receive annotation information uploaded by an annotating client side and geographical location information of a user mobile terminal device;

a place information determination unit 1202 to determine place information about where the user is located according to the geographical location information; and a storage unit 1203 to establish and store a correspondence relationship between the annotation information and the place information to allow determining a target place where a querying user is located based on geographical location information included in a request for querying the annotation information, and returning annotation information corresponding to the target place to a query client side upon receiving the request from the querying client side to query is received.

In an implementation, the apparatus 1200 may further include:

an annotation position information receiving unit 1204 to receive annotation position information of the annotation information in the place that is uploaded by the annotating client side, to add the annotation position information into the correspondence relationship for storage, and to provide the annotation information to a querying user who is in the place and whose field of vision includes the annotation position.

The annotation position information includes image feature information of a scene image in the place that is uploaded by the annotating client side.

Alternatively, the annotation position information includes image feature information of an identifiable object included in a scene image in the place that is uploaded by the annotating client side.

Still alternatively, the annotation position information includes image feature information of an identifiable object included in a scene image in the place uploaded by the annotating client side, and relative positional relationship information between the annotation information and the identifiable object.

In an implementation, a first image feature library may be established for the place in advance, the first image feature library storing an identifier of at least one landmark object in the place and a corresponding image feature. The annotation position information receiving unit 1204 may include:

a first image feature information receiving subunit 1205 to receive image feature information of a scene image in the place that is uploaded by the annotating client side;

a first determination subunit 1206 to determine whether a landmark object in the place exists in the image feature information, and to set an identifier of the landmark object as the annotation position information of the annotation information in the place if affirmative.

Alternatively, a second image feature library is established for the place in advance, the second image feature library storing an identifier of at least one landmark object in the place, a corresponding image feature, and relative coordinate information of at least one selectable annotation point in each landmark object relative to the respective landmark object. The annotation position information receiving unit 1204 may include:

a second image feature information receiving subunit 1207 to receive image feature information of a scene image in the place that is uploaded by the annotating client side;

a second determination subunit 1208 to determine whether a landmark object in the place exists in the image feature information, and return an image feature of the landmark object and relative coordinate information of annotation point(s) thereof if affirmative;

an annotation point information receiving unit 1209 to receive information of a selected annotation point that is uploaded by the annotating client side, and to set the identifier of the landmark object and the information of the annotation point as the annotation position information of the annotation information.

In an embodiment, the apparatus 1200 may further include one or more processors 1210, an input/output interface 1211, a network interface 1212 and memory 1213. The memory 1213 may include a form of computer-readable media as described in the foregoing description.

In an embodiment, the memory 1213 may include program units 1214 and program data 1215. The program units 1214 may include one or more of the foregoing units and/or subunits as described in the foregoing embodiments of the apparatus 1200.

Figure 13:
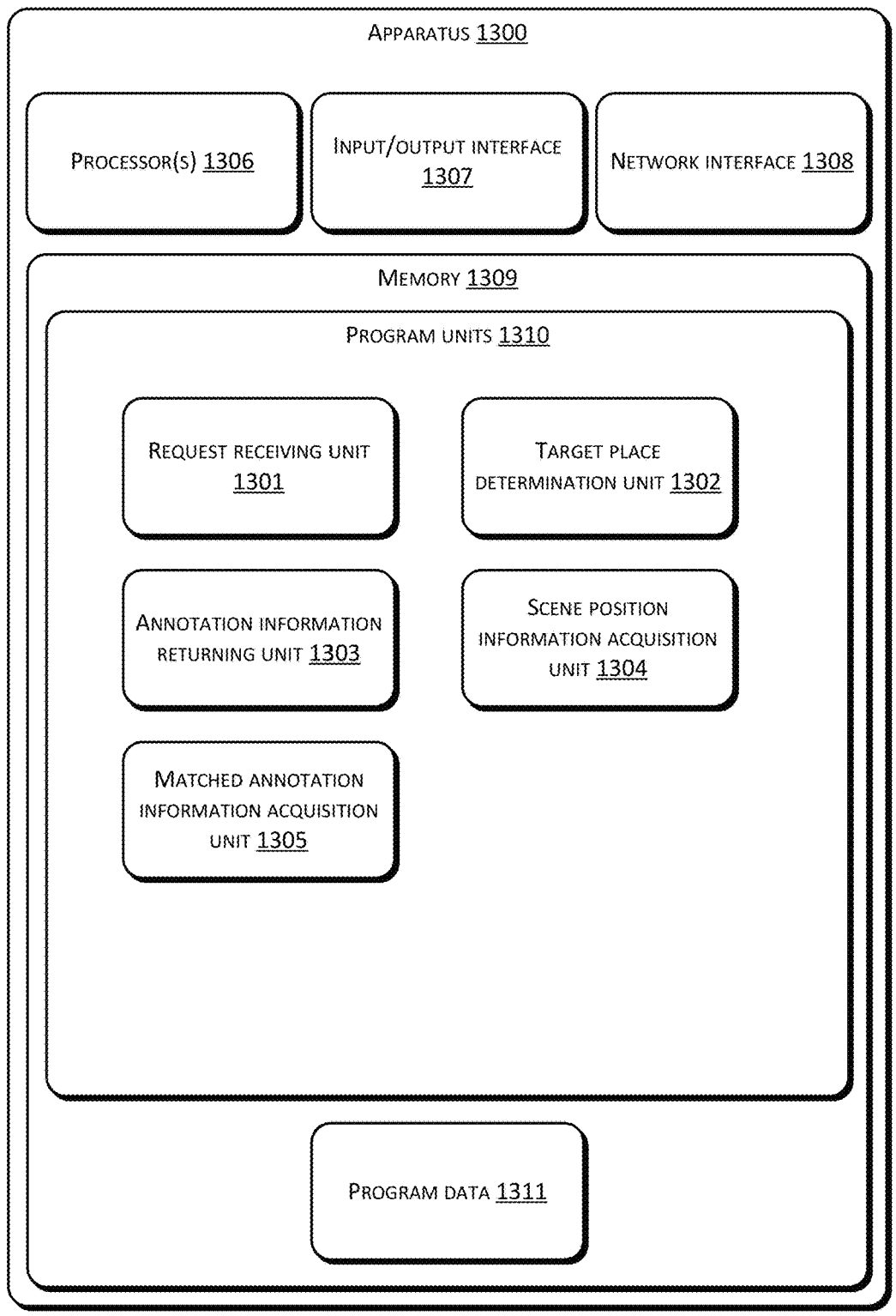
FIG. 13 is a schematic diagram of a fourth example apparatus in accordance with the present disclosure.

Corresponding to the place-based information processing method provided in the fourth embodiment of the present disclosure, an embodiment of the present disclosure further provides a place-based information processing apparatus. Referring to FIG. 13, the apparatus 1300 may include:

a request receiving unit 1301 to receive a request for querying annotation information from a querying client side, the request including geographical location information of a querying user;

a target place determination unit 1302 to determine a target place where the querying user is located according to the geographical location information; and an annotation information returning unit 1303 to determine, according to a pre-established correspondence relationship between the annotation information and place information, the annotation information corresponding to the target place, and return the annotation information to the querying client side.

The correspondence relationship further includes annotation position information of the annotation information in the place. The apparatus 1300 may further include:

a scene position information acquisition unit 1304 to acquire scene position information of the querying user in the current place;

a matched annotation information acquisition unit 1305 to acquire matched annotation information according to respective annotation position information corresponding to each piece of the annotation information, and to return the matched annotation information to the querying client side to enable the querying client side to provide the annotation information at the respective annotation position.

The annotation position information includes image feature information of a scene image in the place that is uploaded by an annotating client side.

The scene position information acquisition unit 1304 may receive image feature information of a scene image in the place that is uploaded by the querying client side.

The matched annotation information acquisition unit 1305 may compare the received image feature information with the image feature information corresponding to each piece of the annotation information, and acquire the matched annotation information.

Alternatively, the annotation position information includes image feature information of an identifiable object in the place.

The scene position information acquisition unit 1304 may receive image feature information of a scene image in the place that is uploaded by the querying client side.

The matched annotation information acquisition unit 1305 may determine whether an identifiable object exists according to the received image feature information, to compare an image feature of the identifiable object with an image feature of a respective identifiable object corresponding to each piece of the annotation information if affirmative, and to acquire the matched annotation information.

Still alternatively, the annotation position information includes image feature information of an identifiable object in the place and relative positional relationship information between the annotation information and the identifiable object.

The scene position information acquisition unit 1304 may receive image feature information of a scene image in the place that is uploaded by the querying client side.

The matched annotation information acquisition unit 1305 may determine whether an identifiable object exists according to the received image feature information, to compare an image feature of the identifiable object with an image feature of a respective identifiable object corresponding to each piece of the annotation information, and to acquire the matched annotation information.

In this case, the apparatus 1300 may further return the image feature information of the identifiable object corresponding to the matched annotation information and the relative positional relationship information to the querying client side.

In an embodiment, the apparatus 1300 may further include one or more processors 1306, an input/output interface 1307, a network interface 1308 and memory 1309. The memory 1309 may include a form of computer-readable media as described in the foregoing description.

In an embodiment, the memory 1309 may include program units 1310 and program data 1311. The program units 1310 may include one or more of the foregoing units and/or subunits as described in the foregoing embodiments of the apparatus 1300.

Through the embodiments of the present disclosure, a user may utilize an application installed in a mobile terminal device thereof to annotate specific information content in a place where the user is located. This type of information content is not limited to text but may also be a picture or voice, etc. "Traces" of the user may therefore be left in the place via various forms of information content. Such "traces" may reflect the feeling that has been expressed by the user or record what the user has seen and heard in the place in a certain a moment of the past, and are not subject to any real condition in the specific place, which does not need real paper and pen and does not affect the actual scenery of the place.

From the description of the foregoing embodiments, one skilled in the art can clearly understand that the present disclosure can be implemented using software with a necessary general hardware platform. Based on this understanding, the essence of the technical solutions in the present disclosure or the part contributing to the existing technologies may be implemented in the form of a software product. The computer software product may be stored in a storage medium, such as a read-only memory (ROM)/a random access memory (RAM), a magnetic disk, or an optical disc, which includes multiple instructions for instructing a computing device (which may be a personal computer, a server, a network device, or the like) to perform the method described in the embodiments or certain parts of the embodiments of the present disclosure.

The embodiments in the specification are described in a progressive manner. Reference may be made to each other for the same or similar parts in the embodiments. An emphasis of each embodiment is different from those of other embodiments. In particular, the apparatuses or apparatus embodiments are basically similar to the method embodiments and are therefore described in a relative simple manner. For relevant part, reference may be made to the description of the part of the method embodiment. The systems or system embodiments described above are merely exemplary. The units that are described as separate components may or may not be physically separated. The components shown as units may or may not be physical units, and may be located in a single location or may be distributed among multiple network units. Some or all of the modules may be selected according to actual needs to achieve the objectives of the solutions of the embodiments. One of ordinary skill in the art can understand and implement the embodiments without making any creative effort.

The methods and apparatuses of place-based information processing that are provided by the present disclosure are described in detail above. Specific examples are used in the specification to explain the principles and implementations of the present disclosure. The description of the foregoing embodiments, however, is merely used to facilitate the understanding of the methods and core ideas of the present disclosure. One of ordinary skill in the art can make modifications to the specific implementations and the application scopes based on the ideas of the present disclosure. Therefore, the content of the specification should not be construed as a limitation to the present disclosure.

What is claimed is:

1. A method of managing a digital collection of location-based annotations obtained via a mobile terminal device, the method implemented by one or more computing devices, the method comprising:

receiving annotation information inputted by a first user;

capturing a first scene image in a place where the first user is located before or after receiving the annotation information inputted by the first user;

extracting a feature information of the first scene image;

acquiring geographical location information of the mobile terminal device;

sending the annotation information, the feature information, and the geographical location information, via the mobile terminal device, to a server, wherein sending the annotation information, the feature information, and the geographical location information enables the server to:

determine information of the place based at least in part on the geographical location information, establish and store a correspondence relationship between the annotation information and the information of the place, determine whether the feature information of the first scene image matches a feature information of a second scene image captured at the place by an image capturing apparatus of a second user, and provide, when the feature information of the first scene image matches the feature information of the second scene image, the annotation information to the second user.

2. The method of claim 1, further comprising:
sending annotation position information of the annotation information in the place to the server for adding and storing the annotation position information into the correspondence relationship, and
wherein providing the annotation information to the second user in the place includes providing the annotation information to the second user when a capture range of the image capturing apparatus of the second user includes the annotation position.

3. The method of claim 1, further comprising:
sending the feature information to the server as annotation position information of the annotation information in the place to the server for adding and storing the annotation position information into the correspondence relationship.

4. The method of claim 3, further comprising:
receiving an image feature of at least one landmark object and relative coordinate information of at least one selectable annotation point relative to each landmark object of the at least one landmark object from the server;
locating the at least one landmark object in the captured scene image based at least in part on the received image feature of the at least one landmark object;
displaying each selectable annotation point of the at least one selectable annotation point of each landmark object on the captured scene image based at least in part on the relative coordinate information; and
sending information of a selected annotation point to the server in response to receiving a selection operation of the first user to the server for adding and storing an identifier of a landmark object which is associated with the selected annotation point and the information about the selected annotation point into the correspondence relationship as annotation position information of the annotation information.

5. The method of claim 1, further comprising:
determining whether the feature information includes an image feature of an identifiable object; and
sending the image feature of the identifiable object to the server as annotation position information of the annotation information in the place to the server for adding and storing the annotation position information into the correspondence relationship in response to determining that the feature information includes the image feature of the identifiable object.

6. The method of claim 1, further comprising:
determining whether the feature information includes an image feature of an identifiable object;
acquiring relative positional relationship information between the annotation information and the identifiable object in response to determining that the feature information includes the image feature of the identifiable object; and
sending the image feature of the identifiable object and the relative positional relationship information to the server as annotation position information of the annotation information in the place to the server for adding and storing the annotation position information into the correspondence relationship.

7. The method of claim 1, further comprising:
acquiring relative positional relationship information between the annotation information and an identifiable object in the scene image, acquiring the relative positional relationship information comprising:
determining a first position point representative of the identifiable object in the scene image;
determining a second position point associated with the annotation information on a display screen of the terminal device based at least in part on an operation of the user;
establishing a coordinate system with the first position point representative of the identifiable object as an origin to establish;
determining coordinates of the second position point associated with the annotation information in the coordinate system; and
using the coordinates of the second position point associated with the annotation information in the coordinate system as the relative positional relationship information between the annotation information and the identifiable object.

8. The method of claim 1, further comprising:
acquiring identity information of the first user; and
sending the identity information of the first user to the server for adding and storing the identity information into the correspondence relationship.

9. One or more computer-readable media storing executable instructions that, when executed by one or more processors, cause the one or more processors to perform acts of managing a digital collection of location-based annotations obtained via one or more mobile terminal devices, the acts comprising:
receiving a request, via a mobile terminal device, for viewing surrounding annotation information from a querying user;
capturing a scene image in a target place where the querying user is located by an image capturing apparatus, before or after receiving the request from the querying user;
obtaining geographical location information of the querying user;
sending the geographical location information, via the mobile terminal device, to a server to enable the server to determine the target place based at least in part on the geographical location information and return one or more pieces of annotation information corresponding to the target place based at least in part on a pre-stored correspondence relationship between information of the target place and the one or more pieces of the annotation information corresponding to the target place; and
providing, when a feature information stored in the pre-stored correspondence relationship matches a feature information of the scene image, the one or more pieces of the annotation information corresponding to the target place returned from the server to the querying user.

10. The one or more computer-readable media of claim 9, the acts further comprising:
receiving image feature information of an identifiable object that is associated with each piece of the annotation information corresponding to the target place; and
displaying each piece of the annotation information around the identifiable object in a scene image shown in a terminal device of the querying user.

11. The one or more computer-readable media of claim 9, the acts further comprising:
receiving image feature information of an identifiable object that is associated with each piece of the annotation information corresponding to the target place;
receiving relative positional relationship information between each piece of the annotation information corresponding to the target place and the identifiable object; and
displaying each piece of the annotation information corresponding to the target place at a corresponding position relative to the identifiable object in a scene image shown in a terminal device of the querying user.

12. The one or more computer-readable media of claim 9, the acts further comprising:
providing prompt information in response to the one or more pieces of the annotation information include mismatched annotation information, the first prompt information instructing the querying user to change a range of capture of the image capturing apparatus.

13. The one or more computer-readable media of claim 9, the acts further comprising sending identity information of the querying user to the server for obtaining identity information of one or more buddy users of the querying user, wherein users leaving the one or more pieces of the annotation information corresponding to the target place comprises at least one user of the one or more buddy users.

14. The one or more computer-readable media of claim 9, the acts further comprising providing prompt information to the querying user for prompting the querying user to leave new annotation information in the place.

15. An apparatus for managing a digital collection of location-based annotations obtained via a user mobile terminal device, the apparatus comprising:
one or more processors;
memory;
an information receiving unit stored in the memory and executable by the one or more processors to receive annotation information uploaded by an annotating client side and geographical location information of the user mobile terminal device, the information receiving unit being configured to receive a first scene image captured in a place where an annotating user is located before or after receiving the annotation information inputted by the annotating user, the first scene image having an extracted feature information;
a place information determination unit stored in the memory and executable by the one or more processors to determine place information of the place based at least in part on the geographical location information;
a storage unit stored in the memory and executable by the one or more processors to establish and store a correspondence relationship between the annotation information and the geographical location information; and
a sending unit stored in the memory and executable by the one or more processors to provide the annotation information to a querying user when the feature information of the first scene image matches a feature information of a second scene image captured in the place by an image capturing apparatus of the querying user.

16. The apparatus of claim 15, wherein the correspondence relationship enables determination of a target place where a querying user is located based at least in part on geographical location information included in a request of querying for the annotation information and a return of the annotation information corresponding to the target place to the querying client in response to receiving the request from the querying client.

17. The apparatus of claim 15, further comprising an annotation point information receiving unit to:
receive annotation position information of the annotation information in the place that is uploaded by the annotating client side; and
add and store the annotation position information into the correspondence relationship.

18. The apparatus of claim 17, wherein the annotation position information comprises one or more of:
image feature information of a scene image in the place that is uploaded by the annotating client side;
image feature information of an identifiable object included in the scene image in the place that is uploaded by the annotating client side; and
relative positional relationship information between the annotation information and the identifiable object.

19. The apparatus of claim 17, further comprising an image feature library established for the place, the image feature library storing an identifier of at least one landmark object in the place and a corresponding image feature, wherein the annotation position information receiving unit comprises:
an image feature information receiving subunit to receive image feature information of a scene image in the place that is uploaded by the annotating client side; and
a determination subunit to determine whether the at least one landmark object in the place exists in the image feature information, and to set the identifier of the at least one landmark object as the annotation position information of the annotation information in the place if affirmative.

20. The apparatus of claim 17, further comprising an image feature library established for the place, the image feature library storing an identifier of at least one landmark object in the place, a corresponding image feature, and relative coordinate information of at least one selectable annotation point associated with each landmark object relative to the landmark object, wherein the annotation position information receiving unit comprises:
an image feature information receiving subunit to receive image feature information of the scene image in the place that is uploaded by the annotating client side;
a determination subunit to determine whether the at least one landmark object in the place exists in the image feature information, and to return an image feature of the at least one landmark object and relative coordinate information of one or more annotation points of the at least one landmark object if affirmative; and
an annotation point information receiving unit to receive information of a selected annotation point that is uploaded by the annotating client side, and to set the identifier of the at least one landmark object and the information of the annotation point as the annotation position information of the annotation information.

* * * * *